(12) United States Patent
Takahashi et al.

(10) Patent No.: US 10,264,624 B2
(45) Date of Patent: Apr. 16, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventors: Kazuyuki Takahashi, Chiba (JP); Lachlan Bruce Michael, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/514,884

(22) PCT Filed: Dec. 3, 2015

(86) PCT No.: PCT/JP2015/083961
§ 371 (c)(1),
(2) Date: Mar. 28, 2017

(87) PCT Pub. No.: WO2016/098601
PCT Pub. Date: Jun. 23, 2016

(65) Prior Publication Data
US 2017/0223769 A1     Aug. 3, 2017

(30) Foreign Application Priority Data
Dec. 17, 2014 (JP) ................................ 2014-255296

(51) Int. Cl.
*H04W 80/04* (2009.01)
*H04H 20/95* (2008.01)
(Continued)

(52) U.S. Cl.
CPC ............ *H04W 80/04* (2013.01); *H04H 20/95* (2013.01); *H04H 60/39* (2013.01); *H04J 3/0697* (2013.01);
(Continued)

(58) Field of Classification Search
CPC ....... H04W 80/04; H04J 3/0697; H04L 69/16; H04L 29/06095; H04L 2012/5667; H04Q 11/0478
See application file for complete search history.

(56) References Cited

U.S. PATENT DOCUMENTS 8,964,900 B2   2/2015  Goto
2012/0314762 A1  12/2012  Herrmann et al.
(Continued)

FOREIGN PATENT DOCUMENTS

JP   2012-222505 A   11/2012
WO   2014/196336 A1  12/2014

OTHER PUBLICATIONS

Extended European Search Report dated Jun. 28, 2018 in Patent Application No. 15869807.6, 9 pages.
(Continued)

*Primary Examiner* — Thai Nguyen
(74) *Attorney, Agent, or Firm* — Oblon, McClelland, Maier & Neustadt, L.L.P.

(57) ABSTRACT

The present technology relates to a transmission apparatus, a transmission method, a reception apparatus, and a reception method that enable channel selection information and time information to be transmitted effectively.
A transmission apparatus acquires channel selection information for selecting a service and time information used for synchronizations on a transmission side and a reception side, generates, as a physical layer frame constituted of a preamble and a data portion, the physical layer frame in which specific information including at least one of the channel selection information and the time information is arranged at a head of the data portion right after the preamble, and transmits the physical layer frame as digital broadcast signals. The present technology is applicable to IP packet broadcasting, for example.

12 Claims, 22 Drawing Sheets

(51) Int. Cl.
*H04J 3/06* (2006.01)
*H04L 29/06* (2006.01)
*H04Q 11/04* (2006.01)
*H04H 60/39* (2008.01)
*H04L 12/70* (2013.01)

(52) U.S. Cl.
CPC ........ *H04L 29/06095* (2013.01); *H04L 69/16* (2013.01); *H04L 69/169* (2013.01); *H04Q 11/0478* (2013.01); *H04L 2012/5667* (2013.01)

(56) References Cited

U.S. PATENT DOCUMENTS

2015/0113584 A1* 4/2015 Herrmann ............ H04N 21/235
 725/116
2015/0229443 A1* 8/2015 Hwang ............... H04L 27/2602
 370/474

OTHER PUBLICATIONS

"Transmission System for Advanced Wide Band Digital Satellite Broadcasting", Association of Radio Industries and Businesses, ARIB STD-B44, Version 2.0-E1, XP055314241, Jul. 31, 2014, pp. 1-120 (with cover pages) [reference previously filed, submitting complete English language translation only).
"Digital Hoso ni Okeru MMT ni yoru Media Transport Hoshiki Hyojun Kikaku, ARIB STD-B60 1.0 edition," Association of Radio Industries and Businesses, 2014, 10 pages (with partial English translation).
"Kodo Kotaiiki Eisei Ditial Hoso no Denso Hoshiki Hyojun Kikaku, ARIB STD-B44 2.0 edition," Association of Radio Industries and Businesses, 2014, 3 pages (with partial English translation).
International Search Report dated Jan. 19, 2016 in PCT/JP2015/083961 filed Dec. 3, 2015.

* cited by examiner

| Packet Type Value | Meaning |
|---|---|
| 000 | IPv4 |
| 001 | Compressed IP Packet |
| 010 | MPEG-2 Transport Stream |
| 011 | Reserved |
| 100 | L2 Signaling |
| 101 | Reserved |
| 110 | Reserved |
| 111 | Extension |

FIG.9

| Packet Type Value | Meaning |
|---|---|
| 000 | IPv4 |
| 001 | Compressed IP Packet |
| 010 | MPEG-2 Transport Stream |
| 011 | Reserved |
| 100 | L2 Signaling |
| 101 | Reserved |
| 110 | Reserved |
| 111 | Extension |

FIG.11

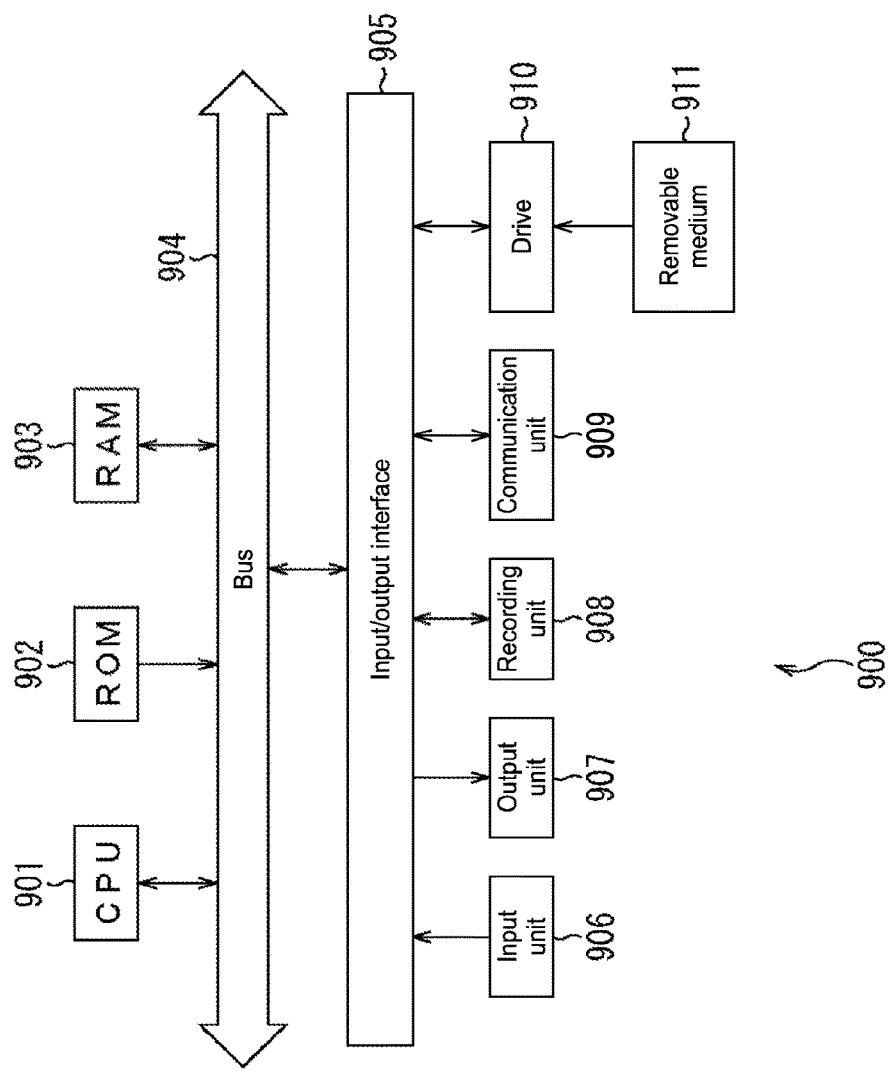

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method, more particularly, to a transmission apparatus, a transmission method, a reception apparatus, and a reception method that enable channel selection information and time information to be transmitted effectively.

BACKGROUND ART

For example, in an ATSC (Advanced Television Systems Committee) 3.0 standard as one of next-generation terrestrial broadcasting standards, it is determined that a UDP/IP, that is, an IP (Internet Protocol) packet including a UDP (User Datagram Protocol) packet is to be used for data transmission instead of a TS (Transport Stream) packet. Also in broadcasting systems other than the ATSC 3.0 standard, IP packets are expected to be used in the future.

Further, in broadcasting systems such as the ATSC 3.0 standard, there is a need to transmit channel selection information for selecting a service (e.g., television program) and time information used for synchronizations on a transmission side and a reception side (see, for example, Non-Patent Literature 1).

CITATION LIST

Non-Patent Literature

Non-Patent Literature 1: "ARIB STD-B44 Version 2.0", Association of Radio Industries and Businesses

DISCLOSURE OF INVENTION

Technical Problem

Incidentally, in the broadcasting systems such as the ATSC 3.0 standard, realizations of high-speed channel selection processing using channel selection information and transmission of highly-accurate time information are being demanded, and thus there is a need to effectively transmit the channel selection information and time information.

The present technology has been made in view of the circumstances as described above and aims at enabling channel selection information and time information to be transmitted effectively.

Solution to Problem

A transmission apparatus according to a first aspect of the present technology includes: a channel selection information acquisition unit that acquires channel selection information for selecting a service; a time information acquisition unit that acquires time information used for synchronizations on a transmission side and a reception side; a physical layer frame generation unit that generates, as a physical layer frame constituted of a preamble and a data portion, the physical layer frame in which specific information including at least one of the channel selection information and the time information is arranged at a head of the data portion right after the preamble; and a transmission unit that transmits the physical layer frame as digital broadcast signals.

The transmission apparatus according to the first aspect of the present technology may be an independent apparatus or an internal block configuring a single apparatus. A transmission method according to the first aspect of the present technology is a transmission method corresponding to the transmission apparatus according to the first aspect of the present technology described above.

In the transmission apparatus and transmission method according to the first aspect of the present technology, the channel selection information for selecting a service is acquired, the time information used for synchronizations on a transmission side and a reception side is acquired, the physical layer frame in which specific information including at least one of the channel selection information and the time information is arranged at the head of the data portion right after the preamble is generated as the physical layer frame constituted of the preamble and the data portion, and the physical layer frame is transmitted as digital broadcast signals.

A reception apparatus according to a second aspect of the present technology includes: a reception unit that receives, as a physical layer frame constituted of a preamble and a data portion, digital broadcast signals including the physical layer frame in which specific information including at least one of channel selection information for selecting a service and time information used for synchronizations on a transmission side and a reception side is arranged at a head of the data portion right after the preamble; a demodulation unit that demodulates the physical layer frame and acquires the specific information that is arranged at the head of the data portion right after the preamble and includes at least one of the channel selection information and the time information; and a processing unit that carries out predetermined processing on the basis of the specific information.

The reception apparatus according to the second aspect of the present technology may be an independent apparatus or an internal block configuring a single apparatus. A reception method according to the second aspect of the present technology is a reception method corresponding to the reception apparatus according to the second aspect of the present technology described above.

In the reception apparatus and reception method according to the second aspect of the present technology, digital broadcast signals including the physical layer frame in which specific information including at least one of the channel selection information for selecting a service and the time information used for synchronizations on a transmission side and a reception side is arranged at the head of the data portion right after the preamble, is received as the physical layer frame constituted of the preamble and the data portion, the physical layer frame is demodulated to acquire the specific information that is arranged at the head of the data portion right after the preamble and includes at least one of the channel selection information and the time information, and the predetermined processing is carried out on the basis of the specific information.

Advantageous Effects of Invention

According to the first and second aspects of the present technology, the channel selection information and time information can be transmitted effectively.

It should be noted that the effects described herein are not necessarily limited, and any effect described in the present disclosure may be obtained.

BRIEF DESCRIPTION OF DRAWINGS

FIG. 9 A diagram showing an example of packet types.

FIG. 11 A diagram showing an example of packet types.

FIG. 22 A diagram showing a configuration example of a computer.

MODE FOR CARRYING OUT THE INVENTION

Figure 1:
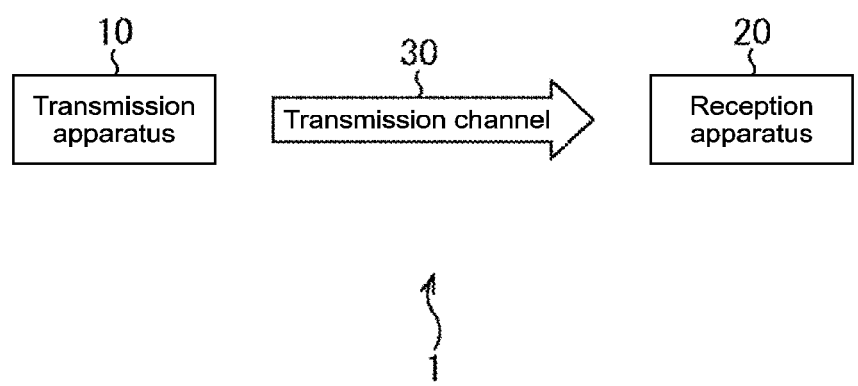
FIG. 1 A diagram showing a configuration of an embodiment of a transmission system to which the present technology is applied.

Hereinafter, an embodiment of the present technology will be described with reference to the drawings. It should be noted that descriptions will be made in the following order.

1. System configuration
2. Frame structure to which present technology is applied
3. Operation examples
  (1) Operation Example 1: L2 signaling transmission system
  (2) Operation Example 2: L2 extension header transmission system
  (3) Operation Example 3: L1 extension header transmission system
4. Configuration of apparatuses
5. Flows of processing executed by respective apparatuses
6. Configuration of computer

1. System Configuration

FIG. 1 is a diagram showing a configuration of an embodiment of a transmission system to which the present technology is applied. It should be noted that the system refers to a logical aggregation of a plurality of apparatuses.

In FIG. 1, a transmission system 1 is configured by a transmission apparatus 10 and a reception apparatus 20.

The transmission apparatus 10 transmits (digital broadcasting or data transmission) a service such as a television program. In other words, the transmission apparatus 10 transmits (sends), as digital broadcast signals, a stream of target data to be transmitted, such as video and audio data as components configuring the service such as a television program, via a transmission channel 30, for example.

The reception apparatus 20 receives the digital broadcast signals transmitted from the transmission apparatus 10 via the transmission channel 30, restores the signals into the original stream, and outputs it. For example, the reception apparatus 20 outputs video and audio data as components configuring the service such as a television program.

It should be noted that the transmission system 1 shown in FIG. 1 is applicable to data transmissions conforming to DVB (Digital Video Broadcasting) standards, ISDB (Integrated Services Digital Broadcasting) standards, and the like and other data transmissions, in addition to data transmissions conforming to ATSC (Advanced Television Systems Committee standards) standards. Moreover, in addition to terrestrial broadcasting, a satellite connection, a cable television network (wired line), or the like can be adopted as the transmission channel 30.

2. Frame Structure to which Present Technology is Applied (Frame Structure)

Figure 2:
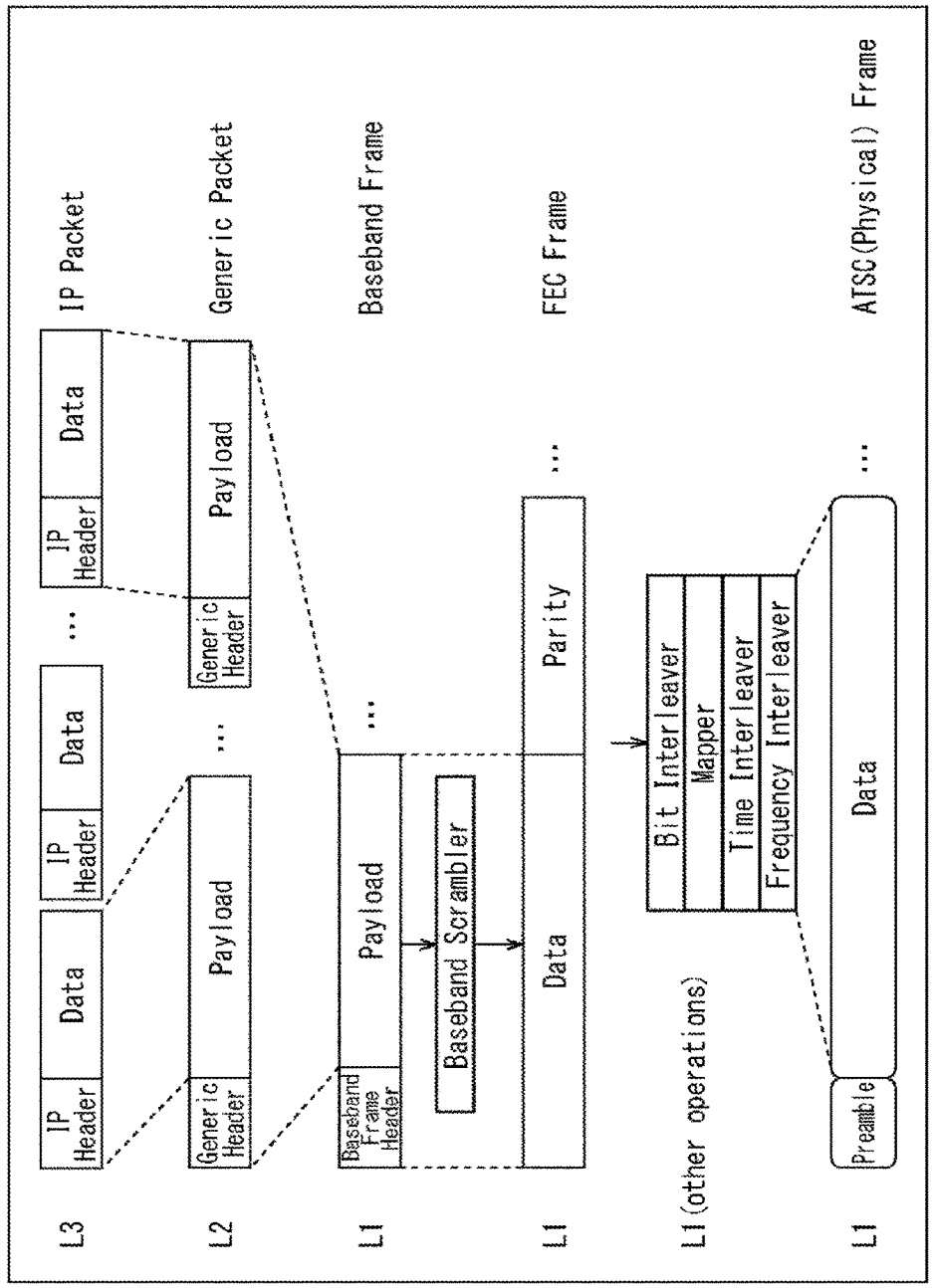
FIG. 2 A diagram showing a frame structure of each layer.

FIG. 2 is a diagram showing frame structures of layers 1 (L1) to 3 (L3).

As shown in FIG. 2, IP packets (IP Packet) are transmitted in the layer 3 (L3). The IP packet is configured by an IP header (IP Header) and data (Data). Video and audio data, signaling information such as channel selection information and time information, and the like are arranged in the data of the IP packet. Further, a Generic packet (Generic Packet) as a transmission packet is transmitted in the layer 2 (L2). The Generic packet is configured by a Generic header (Generic Header) and a payload (Payload). In the payload of the Generic packet, one or a plurality of IP packets is/are arranged and encapsulated (encapsulation).

A BB frame (Baseband frame) of the layer 1 (L1) corresponding to a physical layer is configured by a BB frame header (Baseband Frame Header) and a payload (Payload). In the payload of the BB frame, a plurality of Generic packets are arranged and encapsulated. Also in the layer 1, data (Data) obtained by scrambling a plurality of BB frames is mapped onto an FEC frame (FEC frame), and an error correction parity (Parity) of the physical layer is added thereto.

Here, a physical layer frame (ATSC (Physical) Frame) of the layer 1 (L1) is configured by a preamble (Preamble) and a data portion (Data). In addition, data obtained by carrying out bit interleave on a plurality of FEC frames, carrying out mapping processing after that, and also carrying out physical layer processing such as interleave in a time direction and a frequency direction is mapped onto the data portion of the physical layer frame.

Incidentally, a physical layer frame structure used in a DVB-T2 standard and an ATSC 3.0 standard is configured in a length of 100 to 200 ms. In the physical layer frame, acquisition of the preamble enables data of the subsequent data portion to be acquired. In the reception apparatus 20, a physical layer frame is output when digital broadcast signals having a predetermined frequency are received by a tuner, but in a case where data is acquired from the middle of the physical layer frame structure, data obtained before the next preamble appears is discarded. In other words, the data acquisition timing of the reception apparatus 20 is restricted by the physical layer frame structure.

(Transmission of Channel Selection Information)

Here, for selecting a service (e.g., television program) transmitted by digital broadcast signals in the reception apparatus 20, signaling information (e.g., LLS (Low Layer Signaling) signaling information to be described later) including channel selection information needs to be acquired. However, since there is no guarantee on where the channel selection information is arranged and data is discarded in a case where data is acquired in the middle of a physical layer frame structure as described above, an amount of data to be discarded is required to be made as small as possible, and a delay of a channel selection time is required to be suppressed so that channel selection processing can be carried out at high speed. It should be noted that in the case of an MPEG2-TS system, a maximum value of a transmission interval of service information (PSI/SI) is determined.

Figure 3:
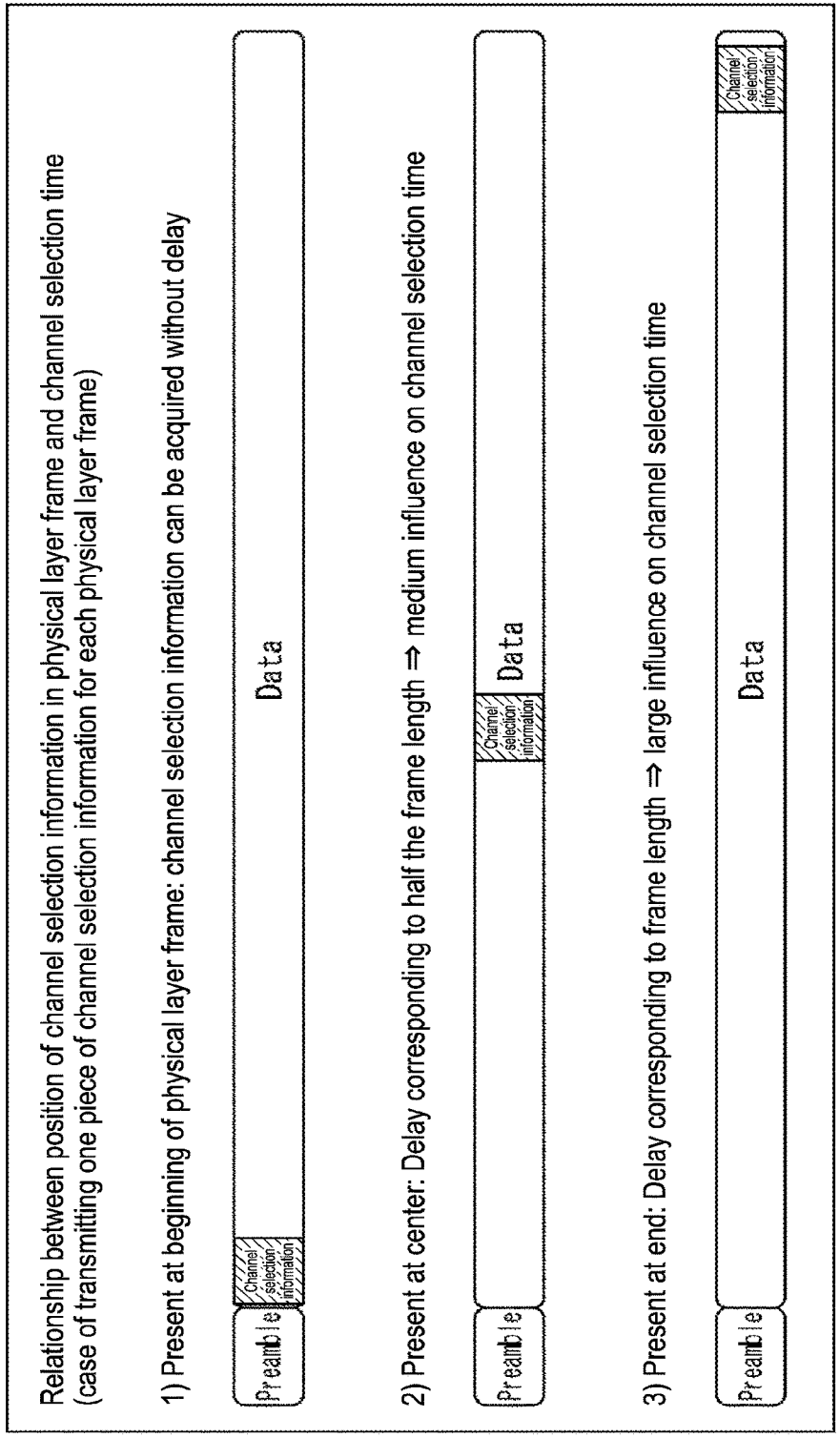
FIG. 3 A diagram showing a relationship between a position of channel selection information and a channel selection time in a case where one piece of channel selection information is transmitted for each physical layer frame.

FIG. 3 is a diagram showing a relationship between a position of channel selection information and a channel selection time in a case where one piece of channel selection information is transmitted for each physical layer frame.

In a case where channel selection information is arranged at a beginning (head) of the data portion of the physical layer frame in an upper stage of FIG. 3, the reception apparatus 20 can immediately acquire the channel selection information after acquiring the preamble without delay. In this case, the position of the channel selection information does not influence the channel selection time. Further, in a case where the channel selection information is arranged at a center of the data portion of the physical layer frame in a middle stage of FIG. 3, the reception apparatus 20 can acquire the channel selection information after a delay of substantially half the frame length of the physical layer frame occurs since the acquisition of the preamble. In this case, the influence of the position of the channel selection information on the channel selection time becomes larger than that of the case in the upper stage of FIG. 3 (influence rate becomes "medium").

In a case where the channel selection information is arranged at the end (tail) of the data portion of the physical layer frame in a lower stage of FIG. 3, the reception apparatus 20 can acquire the channel selection information after a delay corresponding to the frame length of the physical layer frame occurs since the acquisition of the preamble. In this case, the influence of the position of the channel selection information on the channel selection time becomes larger than that of the case in the middle stage of FIG. 3 (influence rate becomes "large"). In other words, in this case, the reception apparatus 20 needs to wait for a time corresponding to substantially the frame length before acquiring the channel selection information, and since the reception apparatus 20 selects a service (e.g., television program) transmitted by digital broadcast signals using the channel selection information, all of data obtained before the channel selection information is acquired is discarded.

As described above, in the case where one piece of channel selection information is transmitted for each physical layer frame, the more rearward the position of the channel selection information in the physical layer frame becomes, the more amount of data is to be discarded and the more the delay of channel selection time becomes.

Figure 4:
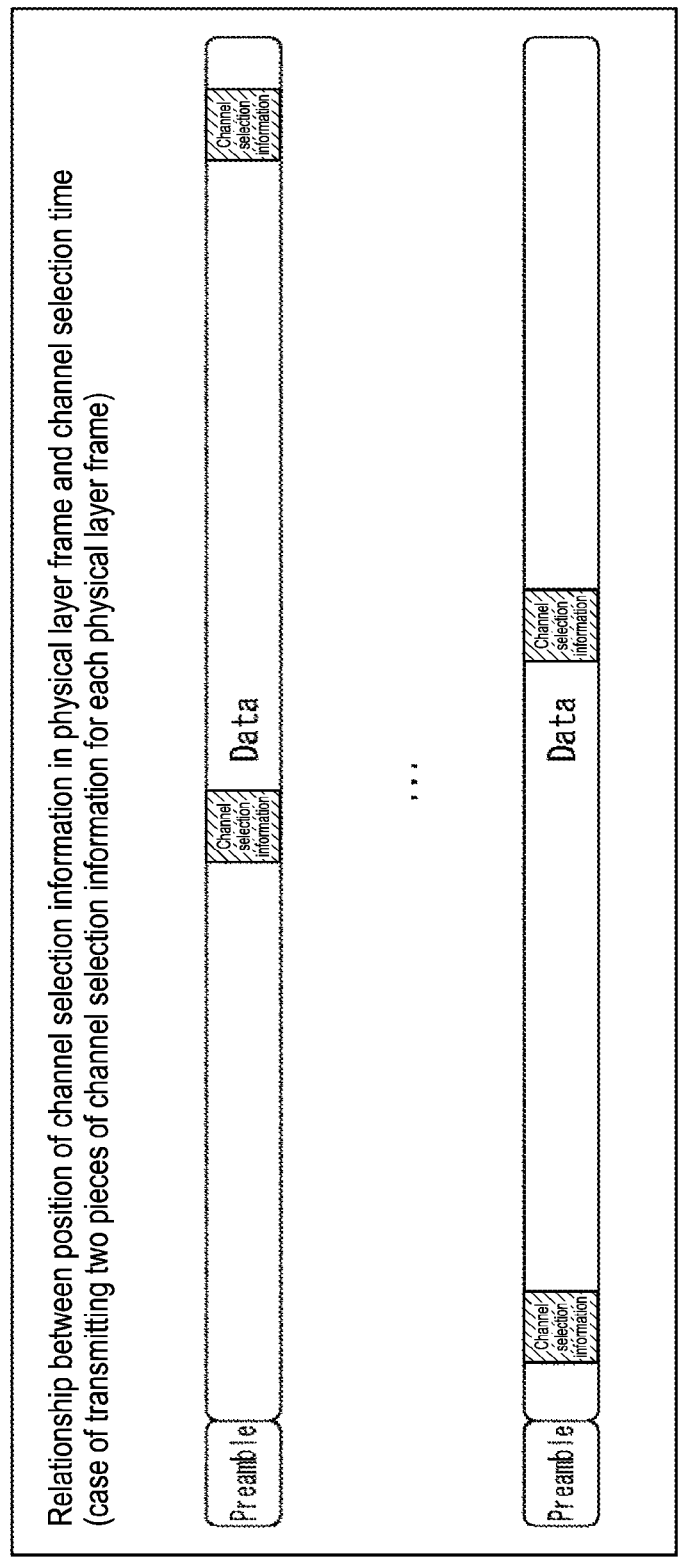
FIG. 4 A diagram showing a relationship between the position of channel selection information and the channel selection time in a case where two pieces of channel selection information are transmitted for each physical layer frame.

FIG. 4 is a diagram showing a relationship between the position of channel selection information and the channel selection time in a case where two pieces of channel selection information are transmitted for each physical layer frame.

In a case where channel selection information is arranged at two positions, e.g., near the center and at a rear of the data portion of the physical layer frame in an upper stage of FIG. 4, the reception apparatus 20 can acquire the channel selection information arranged near the center after a delay of substantially half the frame length of the physical layer frame occurs since the acquisition of the preamble. In this case, while at least one of the channel selection information is assumed to be arranged between the head and middle of the data portion of the physical layer frame since the channel selection information is arranged at two positions, the position of the channel selection information influences the channel selection time as compared to the case described above where the channel selection information is arranged at the beginning of the data portion of the physical layer frame in the upper stage of FIG. 3, for example.

Further, in a case where the channel selection information is arranged at two positions, e.g., at a fore part and near the center of the data portion of the physical layer frame in a lower stage of FIG. 4, the reception apparatus 20 can acquire the channel selection information arranged at the fore part after a small delay since the acquisition of the preamble. In this case, while the channel selection information is arranged at two positions and one of the channel selection information is arranged at the fore part of the data portion of the physical layer frame, the position of the channel selection information influences the channel selection time as compared to the case described above where the channel selection information is arranged at the beginning of the data portion of the physical layer frame in the upper stage of FIG. 3, for example.

As described above, in the case where a plurality of pieces of channel selection information are transmitted for each physical layer frame, since the number of pieces of channel selection information arranged per physical layer frame increases and a transmission cycle of the channel selection information is shortened, the reception apparatus 20 can readily acquire the channel selection information, and thus a delay of the channel selection time is expected to improve. Meanwhile, the channel selection information is not guaranteed to be arranged at an optimal position in the physical layer frame. Therefore, the possibility of the influence on the channel selection time remaining becomes larger than the case described above where the channel selection information is arranged at the beginning (head) of the data portion of the physical layer frame in the upper stage of FIG. 3, for example.

Further, since the data amount of channel selection information that occupies the entire data amount of the physical layer frame increases when a plurality of pieces of channel selection information are arranged in (a data portion of) a single physical layer frame, it may become necessary to delete data amounts of videos and audio that much. In such a case, data transmissions of videos and audio may also be influenced to cause, for example, lowering of image quality and sound quality. Furthermore, since channel selection processing can basically be carried out as long as one piece of channel selection information is acquired, an importance of the second and subsequent pieces of channel selection information is lowered.

In this regard, in a physical layer frame to which the present technology is applied, channel selection information is mapped at a head of a data portion transmitted right after a preamble and transmitted so that the reception apparatus 20 readily acquires the channel selection information from the physical layer frame, to thus shorten the channel selection time and realize high-speed channel selection processing.

Figure 5:
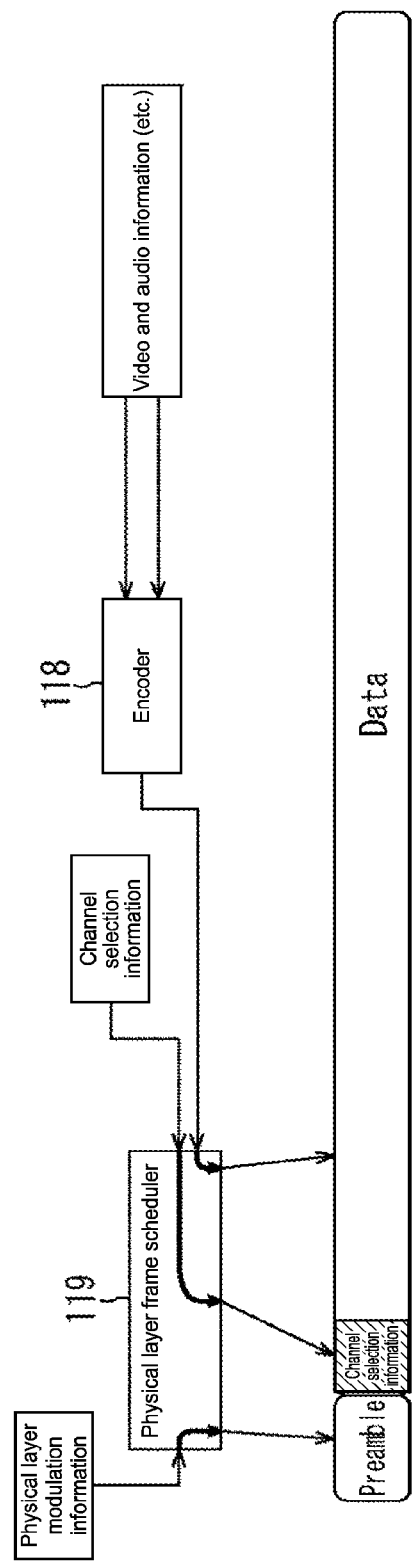
FIG. 5 A diagram for explaining an arrangement of the channel selection information at an optimal position by a physical layer frame scheduler.

Here, as shown in FIG. 5, in the transmission apparatus 10, a timing of data arranged in the physical layer frame structure is managed by a physical layer frame scheduler 119. Specifically, the physical layer frame scheduler 119 is capable of managing such that physical layer modulation information as modulation information related to the physical layer and video and audio data as components configuring a service (e.g., television program) encoded by an encoder 118 are arranged at predetermined positions of the physical layer frame. Specifically, the physical layer frame scheduler 119 arranges the physical layer modulation information in the preamble and the video and audio data in the data portion.

Further, in the transmission apparatus 10, the physical layer frame scheduler 119 manages such that the channel selection information is arranged at a head of the data portion of the physical layer frame. By arranging the channel selection information right after the preamble in the physical layer frame in this way, the reception apparatus 20 can readily acquire the channel selection information requisite for the channel selection from the data portion after acquiring the preamble, with the result that the channel selection time can be shortened and high-speed channel selection processing can be realized. Furthermore, since the reception apparatus 20 can acquire the channel selection information merely by a normal operation of sequentially acquiring data from the head of the data portion after acquiring the preamble, a circuit for acquiring channel selection information arranged at a head of the data portion of the physical layer frame or the like does not need to be newly added.

(Transmission of Time Information)

Incidentally, in digital broadcasting, accurate time information needs to be transmitted for synchronizing the transmission-side transmission apparatus 10 and the reception-side reception apparatus 20. While PCR (Program Clock Reference) is used as the time information in the MPEG2-TS system, NTP (Network Time Protocol) is assumed to be used in a system applied to IP packet broadcasting (IP transmission system).

Figure 6:
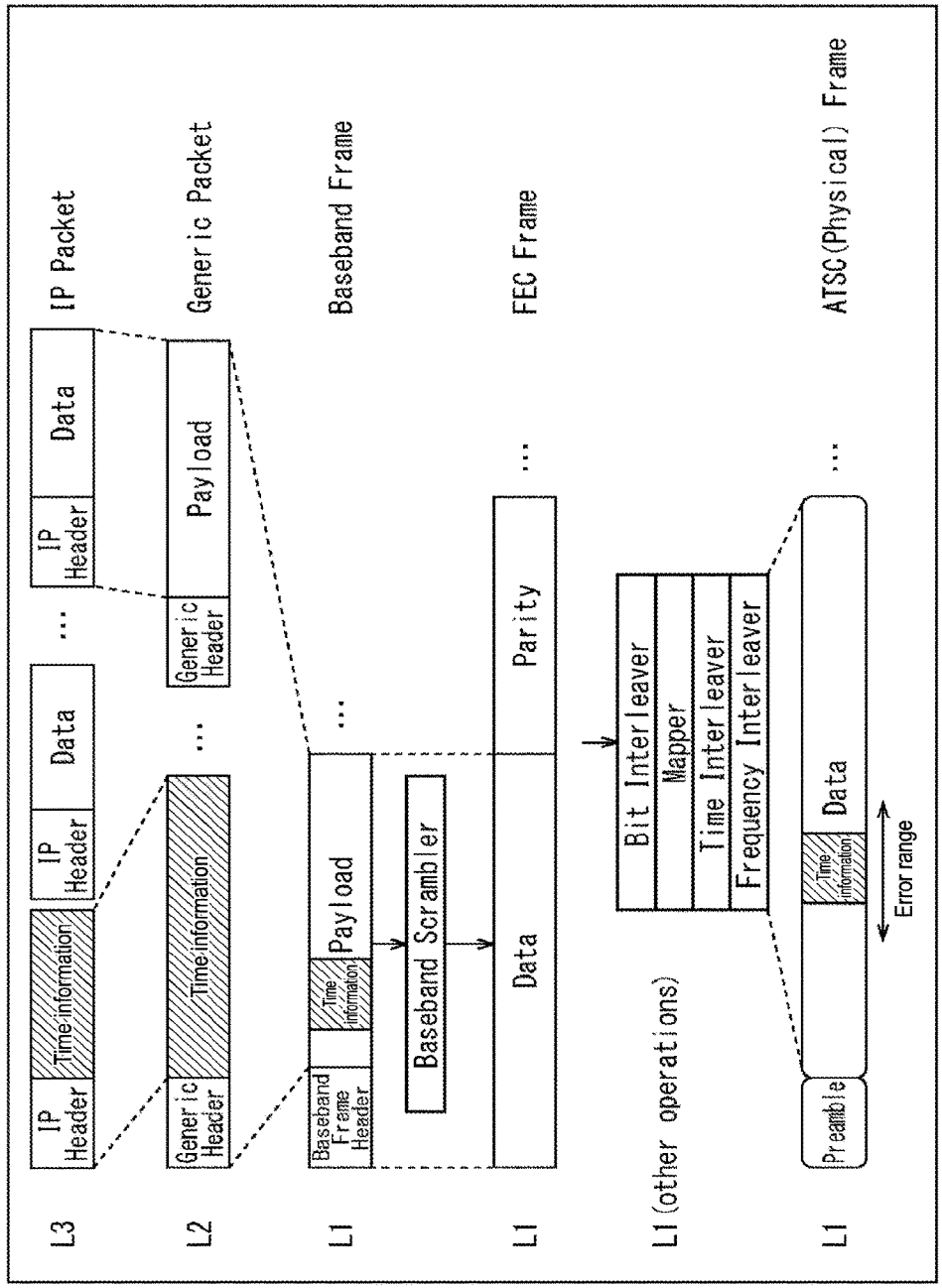
FIG. 6 A diagram showing a position of time information mapped onto the physical layer frame.

FIG. 6 is a diagram showing a position of time information mapped onto the physical layer frame.

In FIG. 6, time information such as NTP is arranged in data of an IP packet. This IP packet is arranged in a payload of a Generic packet and encapsulated. Moreover, a plurality of Generic packets including this Generic packet (Generic packet including time information) are arranged in a payload of a BB frame and encapsulated. Further, data obtained by scrambling a plurality of BB frames is mapped onto an FEC frame, and an error correction parity of the physical layer is added thereto.

Then, data obtained by carrying out processing of the physical layer such as bit interleave on a plurality of FEC frames is mapped onto the data portion of the physical layer frame. In this way, the time information such as NTP is mapped onto the physical layer frame. However, since the IP packet, the Generic packet, the BB frame, and the FEC frame are successively multiplexed before the time information is mapped onto the physical layer frame, an error is caused at a position where the time information is arranged due to an influence of jitters and the like ("error range" in figure).

Specifically, although there is a need to transmit accurate time information for synchronization in digital broadcasting, the time information is not guaranteed to be mapped at an accurate position of the physical layer frame since IP packets are multiplexed (multiplexing is repeated), and when an error with respect to the time information exceeds an allowable range, accuracy of synchronization of videos and audio may become insufficient, for example. Therefore, an improvement thereof is being demanded.

In this regard, in the physical layer frame to which the present technology is applied, time information is mapped at a head of a data portion of the physical layer frame provided right after and transmitted subsequent to a preamble of the physical layer frame transmitted in a certain cycle, to realize highly-accurate transmissions of time information. Accordingly, the video and audio can be synchronized for sure in the reception apparatus 20, for example.

Figure 7:
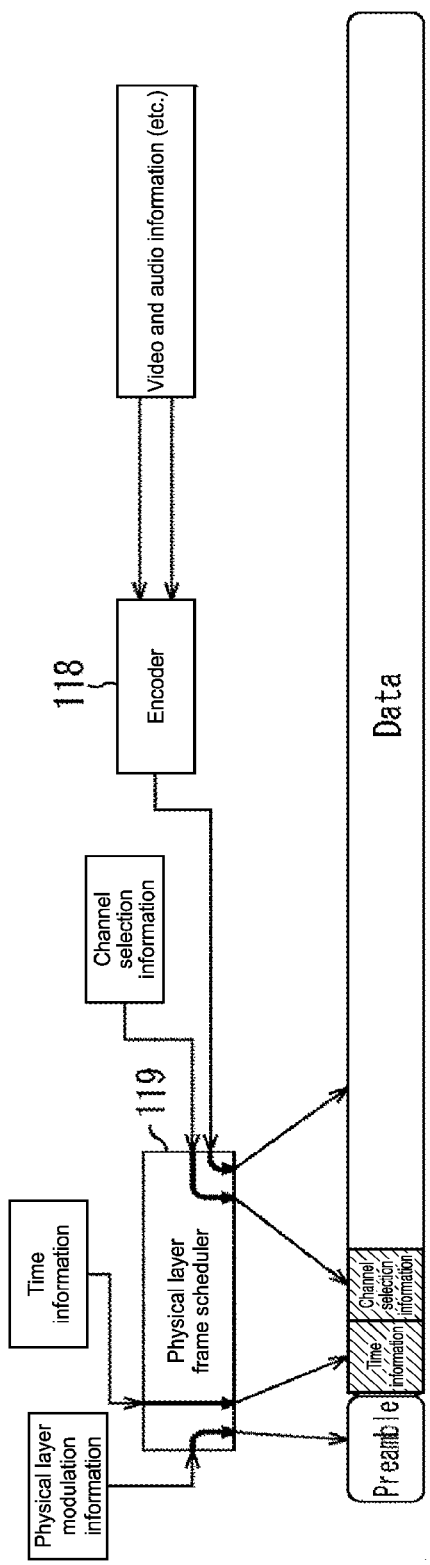
FIG. 7 A diagram for explaining an arrangement of the time information at an optimal position by the physical layer frame scheduler.

Specifically, as shown in FIG. 7, in the transmission apparatus 10, the physical layer frame scheduler 119 manages the frame such that the time information such as NTP is arranged at a head of a data portion of the physical layer frame as in the case of the channel selection information shown in FIG. 5. It should be noted that since the time information to be transmitted can be predicted and arranged well before the processing time required by the physical layer frame scheduler 119, high accuracy can be secured.

3. Operation Examples

Next, Operation Examples 1 to 3 will be described as specific examples for arranging channel selection information and time information at a head of a data portion (right after preamble) of a physical layer frame and transmitting them.

(1) Operation Example 1

Figure 8:
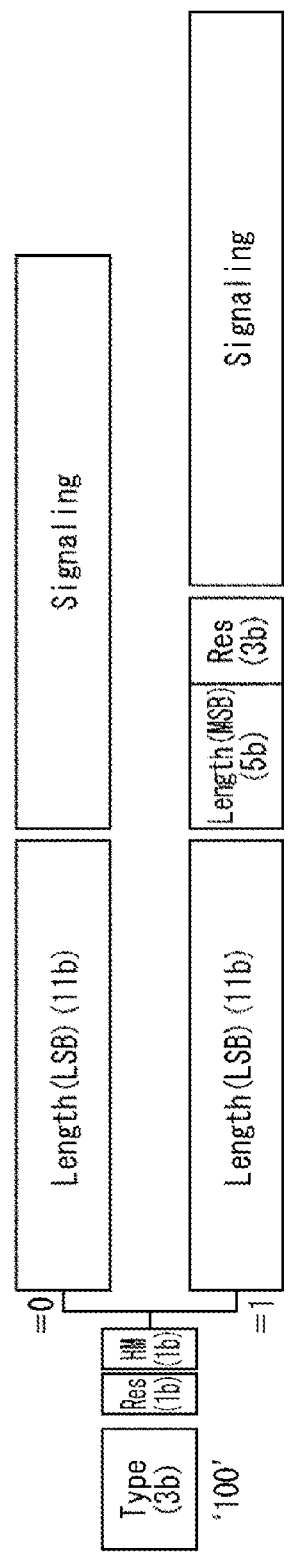
FIG. 8 A diagram for explaining Operation Example 1 that uses an L2 signaling transmission system.

FIG. 8 is a diagram for explaining Operation Example 1 that uses a system of transmitting channel selection information and time information using L2 signaling (L2 Signaling) (hereinafter, referred to as "L2 signaling transmission system"). In this L2 signaling transmission system, the channel selection information and time information are arranged as L2 signaling information in a payload of a first Generic packet in a first BB frame of the physical layer frame.

FIG. 8 shows a configuration of the Generic packet. In the Generic packet shown in FIG. 8, 3-bit type information (Type) is set at a head of a Generic header. As shown in FIG. 9, information on a type of data arranged in a payload of the Generic packet is set in this type information.

Specifically, in a case where an IPv4 IP packet is arranged in the payload, "000" is set as the type information. Moreover, in a case where a compressed IP packet is arranged in the payload, "001" is set as the type information. Furthermore, in a case where an MPEG2-TS-format TS packet is arranged in the payload, "010" is set as the type information.

Further, in a case where L2 signaling information is arranged in the payload, "100" is set as the type information. It should be noted that in FIG. 9, type information "011", "101", and "110" are undefined (Reserved). Moreover, in a case where an extension by 3 undefined (Reserved) areas is insufficient, "111" is set for extending the type information constituted of a predetermined area.

Referring back to FIG. 8, since L2 signaling information is arranged in the payload in the L2 signaling transmission system, "100" is set as the type information of the Generic header. Also in the Generic header, a 1-bit reserved area (Res: Reserved) is arranged subsequent to the type information set as "100", and a header mode (HM: Header Mode) is arranged subsequent to the reserved area.

In a case where "0" is set as the header mode, 11-bit length information (Length (LSB)) is arranged subsequent to the header mode. This length information is set to a length of the payload of the Generic packet. On the other hand, in a case where "1" is set as the header mode, length information of a total of 16 bits, that is, 11-bit length information (Length (LSB)) and 5-bit length information (Length (MSB)), is arranged subsequent to the header mode, and a 3-bit reserved area (Res) is arranged after that.

In other words, since the length information (Length (LSB)) is 11 bits in the case where "0" is set as the header mode, a value within a range of 0 to 2047 (=2$^{11}$-1) bytes can be expressed as the length of the payload of the Generic packet. However, the 11-bit length information cannot express a payload length of 2048 bytes or more. In this regard, in a case where data of 2048 bytes or more is arranged in the payload, "1" is set as the header mode to add 1 byte as an area of the Generic header. Accordingly, the payload length of 2048 bytes or more can be expressed.

In the Generic packet, a payload is arranged subsequent to the Generic header configured as described above. Here, since "100" is set as the type information of the Generic header, L2 signaling information is arranged in the payload. Further, in the L2 signaling transmission system, the channel selection information and time information are arranged as the L2 signaling information. It should be noted that as described above, the Generic packet in which the L2 signaling information including the channel selection information and time information is arranged in the payload corresponds to the first Generic packet of the first BB frame in the physical layer frame.

In this way, by arranging the L2 signaling information including the channel selection information and time information in the payload of the first Generic packet of the first BB frame in the physical layer frame using the L2 signaling transmission system as a transmission format for transmitting the channel selection information and time information, the channel selection information and the time information can be arranged at a head of data (right after preamble) of the physical layer frame and transmitted.

(2) Operation Example 2

Figure 10:
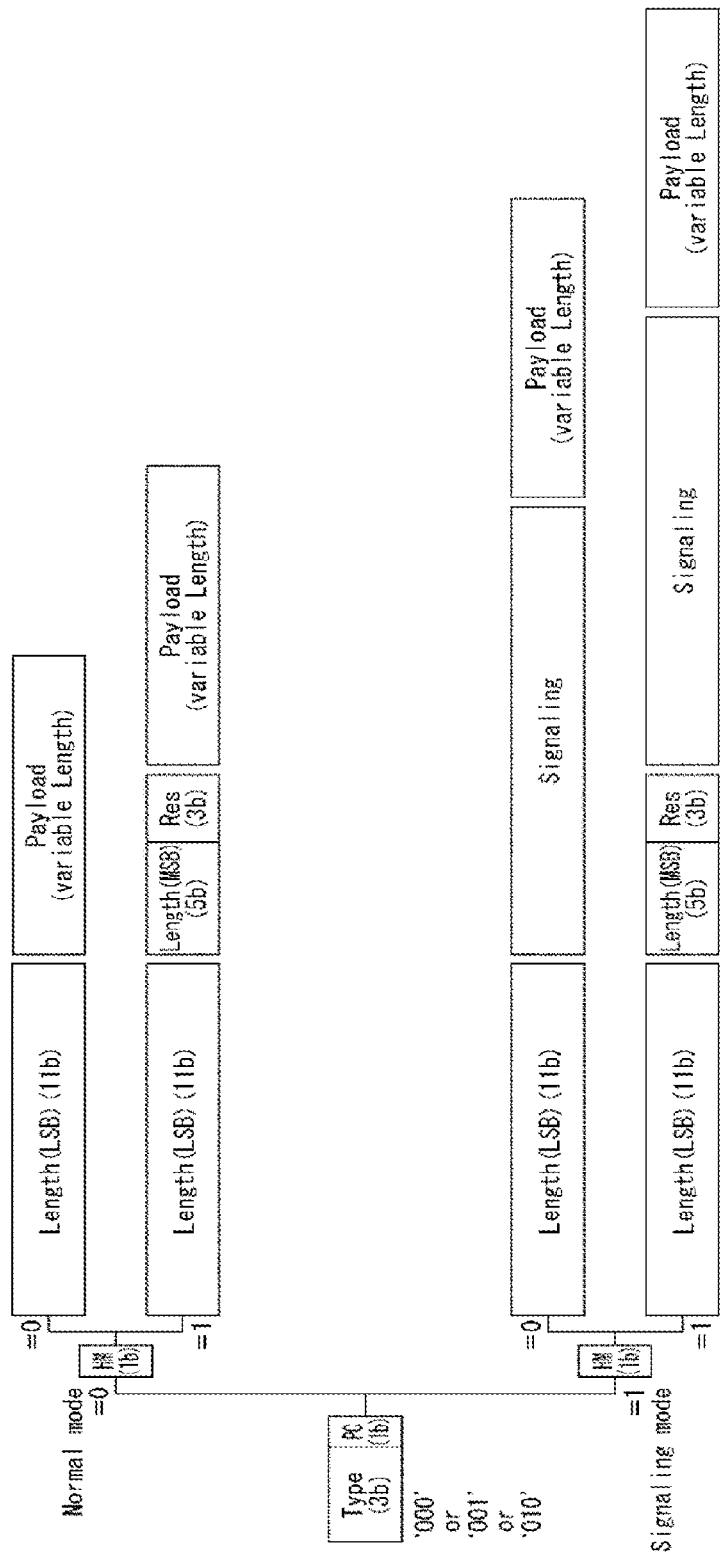
FIG. 10 A diagram for explaining Operation Example 2 that uses an L2 extension header transmission system.

FIG. 10 is a diagram for explaining Operation Example 2 that uses a system of transmitting channel selection information and time information using an L2 extension header (L2 Extension Header) (hereinafter, referred to as "L2 extension header transmission system"). In the L2 extension header transmission system, the channel selection information and time information are arranged in an extension header of a first Generic packet of a first BB frame in the physical layer frame.

FIG. 10 shows a configuration of the Generic packet. In the Generic header shown in FIG. 10, "000", "001", or "010" is set as the 3-bit type information. Specifically, as shown in FIG. 11, an IPv4 IP packet is arranged in the payload in a case where "000" is set as the type information, and a compressed IP packet is arranged in the payload in a case where "001" is set as the type information. Moreover, in a case where "010" is set as the type information, a TS packet is arranged in the payload. It should be noted that although the descriptions have been made that "000", "001", or "010" is set as the type information in the L2 extension header transmission system, it is also possible to set "100" as the type information and arrange L2 signaling information in the payload.

In the Generic header, 1-bit packet setting information (PC: Packet Configuration) is arranged subsequent to the type information set as "000", "001", or "010". In a case where "0" is set as the packet setting information, the Generic header becomes a normal mode (Normal mode), and length information (Length) is arranged in accordance with the header mode (HM) arranged subsequent to the packet setting information. Then, an IPv4 IP packet, a compressed IP packet, or a TS packet is arranged in the payload subsequent to the Generic header in accordance with the type information of the Generic header.

On the other hand, in a case where "1" is set as the packet setting information (PC), the Generic header becomes a signaling mode (Signaling mode), and length information (Length) is arranged in accordance with the header mode (HM) arranged subsequent to the packet setting information. Specifically, in a case where "0" is set as the header mode, 11-bit length information (Length (LSB)) is arranged subsequently. In addition, in a case where the signaling mode is set, the Generic header is extended, and L2 signaling information (Signaling) is arranged subsequent to the length information.

Then, in the L2 extension header transmission system, the channel selection information and time information are arranged as the L2 signaling information to be arranged in the extension header (L2 extension header). It should be noted that a payload is arranged subsequent to the Generic header (L2 extension header) configured as described above. In this payload, an IPv4 IP packet, a compressed IP packet, or the like is arranged in accordance with the type information of the Generic header. It should be noted that as described above, the Generic packet in which the L2 signaling information including the channel selection information and time information is arranged in the extension header (L2 extension header) of the Generic packet corresponds to the first Generic packet of the first BB frame in the physical layer frame.

Further, when "1" is set as the header mode (HM) in a case where "1" is set as the packet setting information (PC), 16-bit length information (Length) and a 3-bit reserved area (Res) are arranged subsequent to the header mode. Further, in a case where the signaling mode is set, the Generic header is extended, and L2 signaling information (Signaling) is arranged subsequent to the reserved area (Res). Then, as in the case above where the header mode is set as "0", the channel selection information and time information are arranged as L2 signaling information to be arranged in the extension header (L2 extension header).

It should be noted that although an IPv4 IP packet, a compressed IP packet, or the like is arranged in the payload subsequent to the extension header (L2 extension header) where the L2 signaling information including the channel selection information and time information is arranged in the Generic packet, this Generic packet corresponds to the first Generic packet of the first BB frame in the physical layer frame as described above.

In this way, by arranging the channel selection information and time information in the extension header (L2 extension header) of the first Generic packet of the first BB frame in the physical layer frame using the L2 extension header transmission system as a transmission format for transmitting the channel selection information and time information, the channel selection information and time information can be arranged at a head of the data (right after preamble) of the physical layer frame and transmitted.

(3) Operation Example 3

Figure 12:
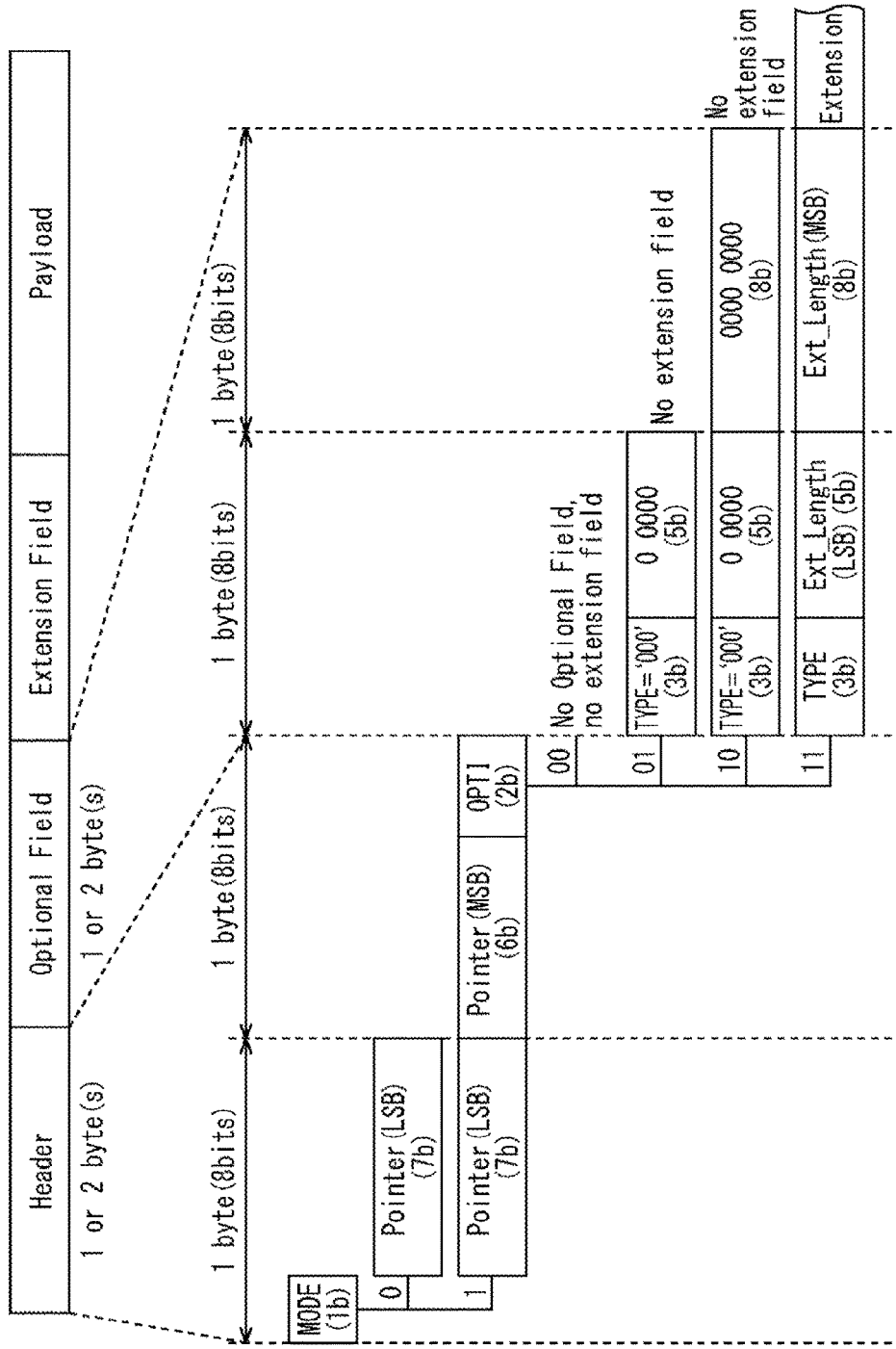
FIG. 12 A diagram for explaining Operation Example 3 that uses an L1 extension header transmission system.

FIG. 12 is a diagram for explaining Operation Example 3 that uses a system of transmitting channel selection information and time information using an L1 extension header (L1 Extension Header) (hereinafter, referred to as "L1 extension header transmission system"). In the L1 extension header transmission system, the channel selection information and time information are arranged in an extension header of a first BB frame in the physical layer frame.

FIG. 12 shows a configuration of a BB frame. In FIG. 12, the BB frame is configured by a BB frame header and a payload (Payload). In addition to a 1- or 2-byte header (Header), an optional field (Optional Field) and an extension field (Extension Field) can be arranged in the BB frame header.

Specifically, in a case where "0" is set as a 1-bit mode (MODE) in the header (Header), 7-bit pointer information (Pointer (LSB)) is arranged. It should be noted that the pointer information is information for indicating a position of the Generic packet arranged in the payload of the BB frame. For example, in a case where data of a Generic packet arranged last in a certain BB frame is arranged across the next BB frame, position information of the Generic packet arranged at a head of the next BB frame can be set as the pointer information.

Further, in a case where "1" is set as the mode (MODE), 7-bit pointer information (Pointer (LSB)) and 6-bit pointer information (Pointer (MSB)), and a 2-bit optional flag (OPTI: OPTIONAL) are arranged. The optional flag is information indicating whether to arrange the optional field (Optional Field) and the extension field (Extension Field) to extend the header.

Figure 13:
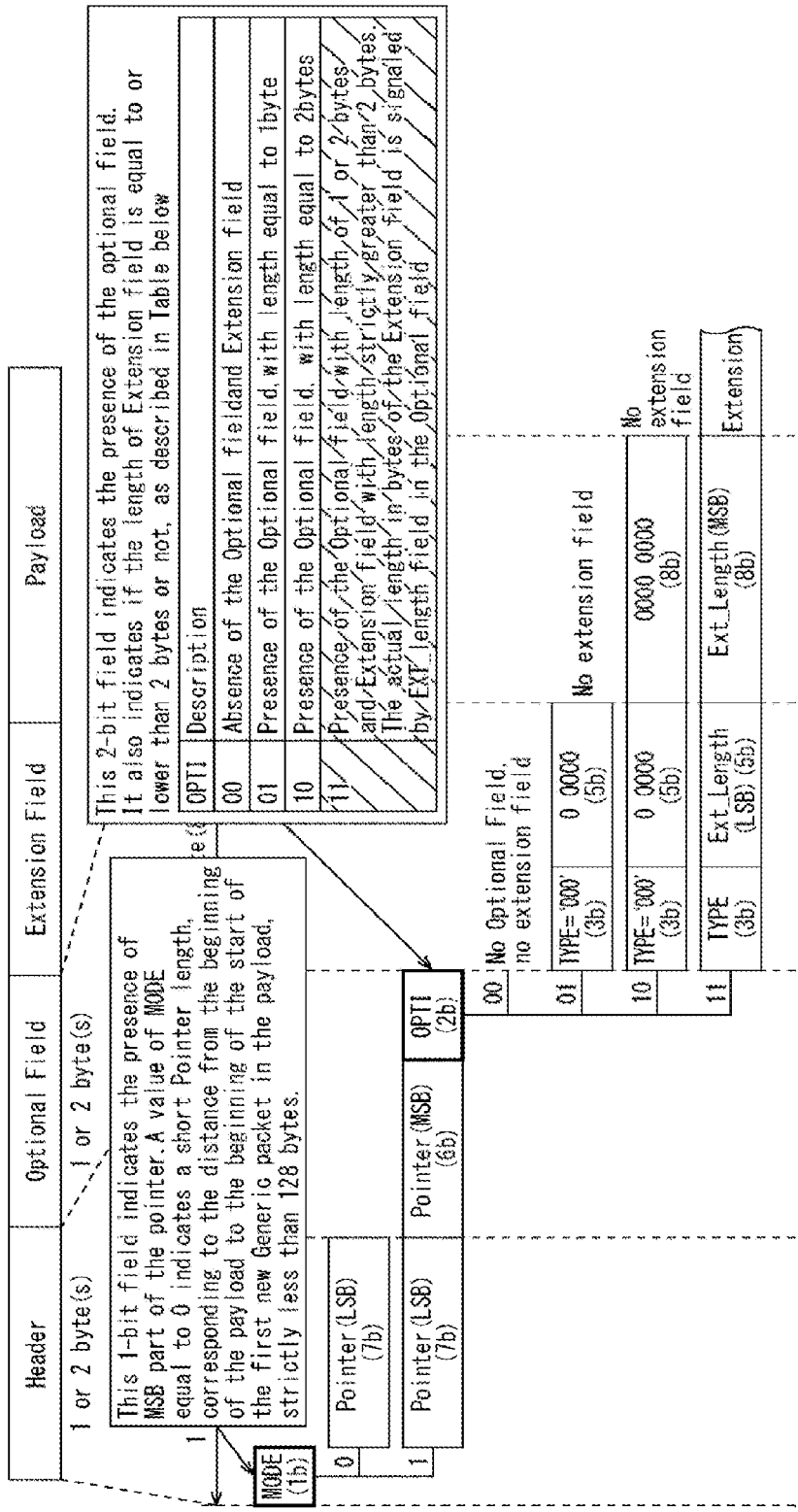
FIG. 13 A diagram for explaining a specific configuration of an extension header in the L1 extension header transmission system.

Specifically, as shown in FIG. 13, when not arranging the optional field and the extension field for the extension, "00" is set as the optional flag. Further, when arranging only the optional field for the extension, "01" or "10" is set as the optional flag. It should be noted that in a case where "01" is set as the optional flag, 1-byte (8-bit) padding is carried out on the optional field. Moreover, in a case where "10" is set as the optional flag, 2-byte (16-bit) padding is carried out on the optional field.

Figure 14:
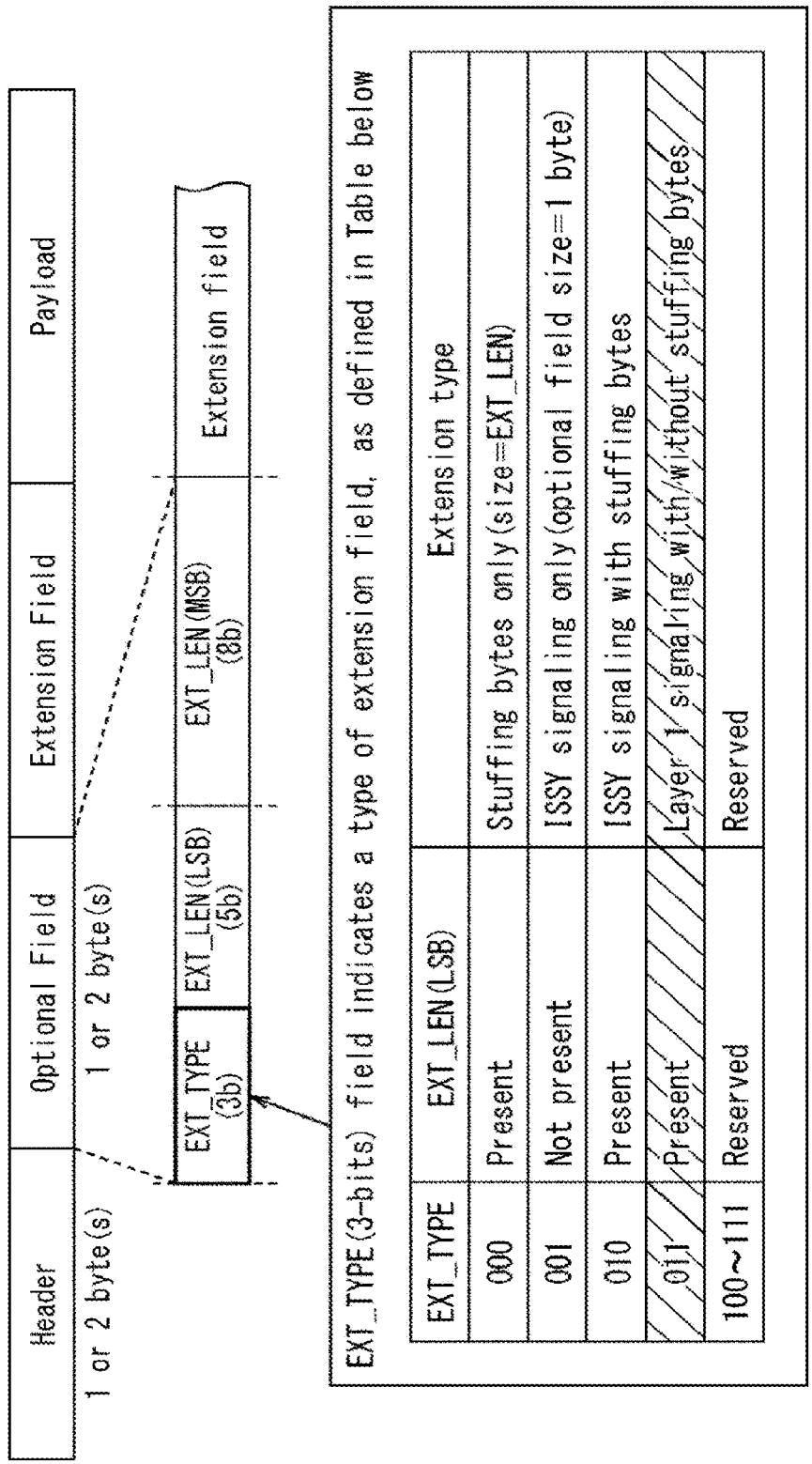
FIG. 14 A diagram for explaining a specific configuration of the extension header in the L1 extension header transmission system.

Further, when arranging the optional field and the extension field for the extension, "11" is set as the optional flag. In this case, 3-bit extension type information (TYPE (EXT_TYPE)) is set at a head of the optional field. As shown in FIG. 14, extension length information (EXT_Length (LSB)) and information on a type of extension field (Extension type), that are arranged subsequent to the extension type information, are set as this type information.

Specifically, in a case of arranging the extension length information and arranging only stuffing bytes (Stuffing Bytes), "000" is set as the extension type information. Moreover, in a case of arranging ISSY (Input Stream Synchronizer) in the extension field without arranging the extension length information, "001" is set as the extension type information. Further, in a case of arranging the extension length information and arranging both ISSY and stuffing bytes in the extension field, "010" is set as the extension type information.

Furthermore, in a case of arranging the extension length information and arranging L1 signaling information in the extension field, "011" is set as the extension type information. In this case, whether to arrange the stuffing bytes is arbitrary. It should be noted that in FIG. 14, the extension type information of "100" to "111" are undefined (Reserved).

In the L1 extension header transmission system, the channel selection information and time information are arranged as the L1 signaling information of this extension field (L1 extension header). Specifically, in the case of using the L1 extension header transmission system, "11" is set as the optional flag (OPTI) to extend the optional field and the extension field, and "011" is set as the extension type information (EXT_TYPE) of the optional field to arrange the L1 signaling information including the channel selection information and the time information in the extension field. It should be noted that as described above, the BB frame in which the L1 signaling information including the channel selection information and time information is arranged in the extension header (L1 extension header) corresponds to the first BB frame of the physical layer frame.

In this way, by arranging the channel selection information and time information in the extension header (L1 extension header) of the first BB frame of the physical layer frame using the L1 extension header transmission system as a transmission format for transmitting the channel selection information and time information, the channel selection information and time information can be arranged at a head of the data (right after preamble) of the physical layer frame and transmitted.

(LLS Signaling Information)

For example, the channel selection information can be transmitted as low-layer LLS signaling information that does not depend on a service. The LLS signaling information includes LLS metadata such as SCD (Service Configuration Description). SCD indicates, as channel selection information, a BBP stream configuration and service configuration within a network by an ID system corresponding to the MPEG2-TS system. Moreover, SCD includes, in addition to parameters of the physical layer, SC bootstrap information for acquiring SCS (Service Channel Signaling) signaling information of a service level, and the like.

Figure 15:
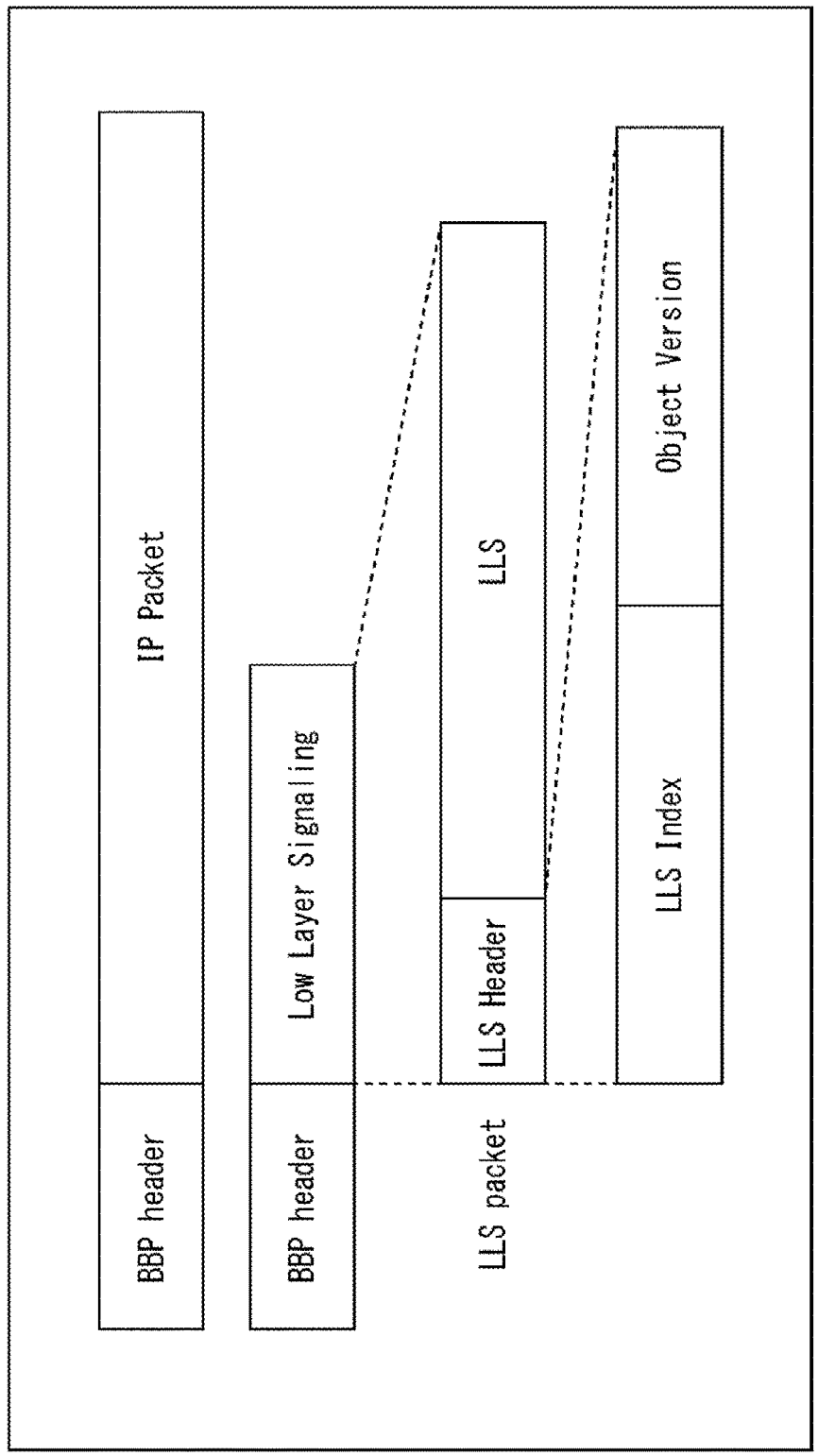
FIG. 15 A diagram for explaining an LLS signaling structure.

FIG. 15 is a diagram showing a structure of an LLS packet.

As shown in FIG. 15, a BBP packet is configured by a BBP header and a payload. When transmitting an IP packet by a BBP stream, the IP packet is arranged in the payload. When transmitting LLS signaling information by the BBP stream, the LLS signaling information is arranged subsequent to the BBP header. As the LLS signaling information, for example, LLS metadata such as SCD described in an XML (Extensible Markup Language) format is arranged.

The BBP header includes 2-bit type information so that which of an IP packet and LLS the BBP packet is can be distinguished by the type information. Moreover, the LLS header is configured by an LLS index and object version information (version information).

Figure 16:
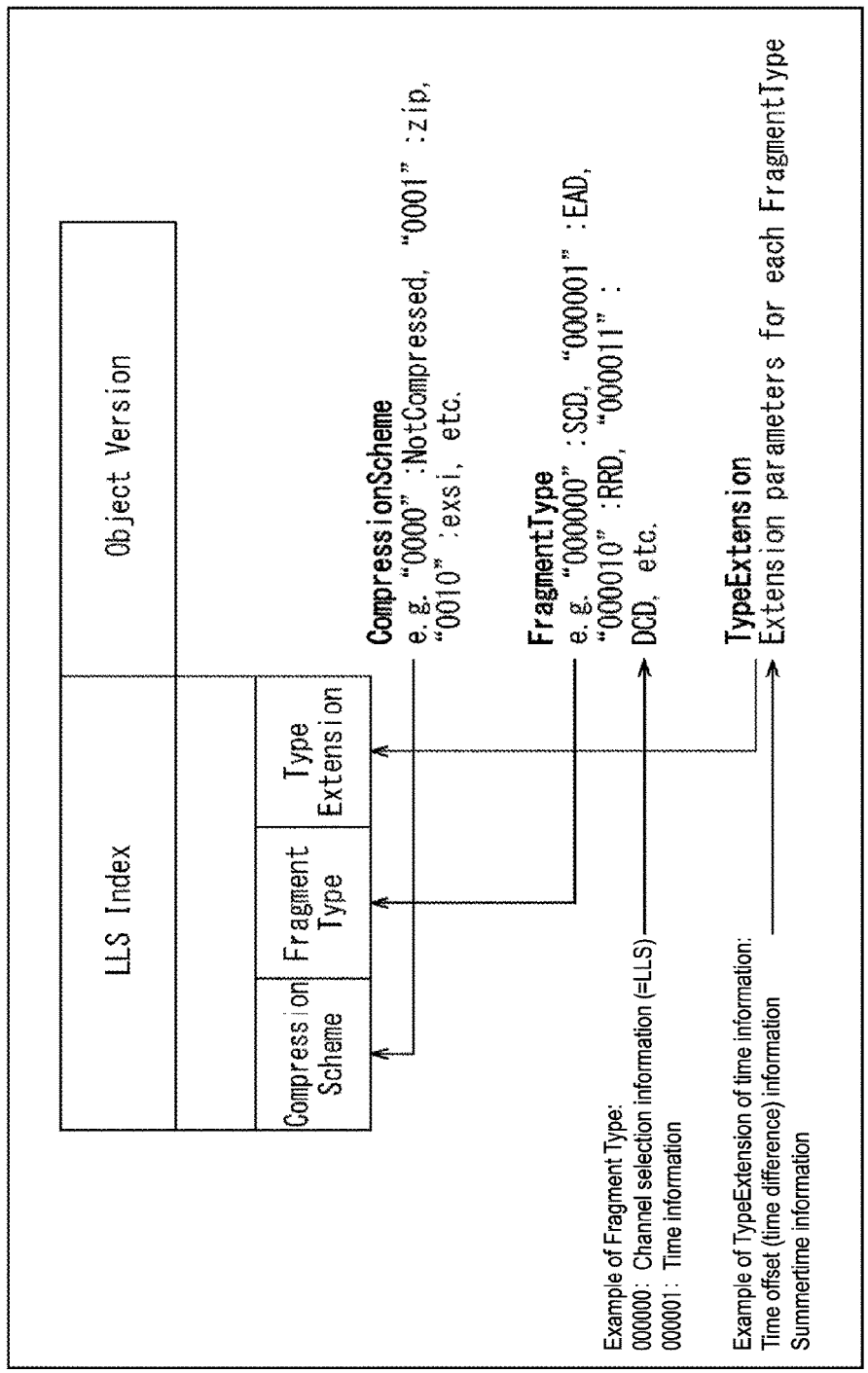
FIG. 16 A diagram showing an example of index information stored in an LLS header.

FIG. 16 is a diagram showing an example of the LLS index of the LLS header shown in FIG. 15.

Compression information (Compression Scheme), type information (Fragment Type), and extension type information (Type Extension) are arranged in the LLS index. Information indicating whether target LLS signaling information is compressed is set as the compression information. For example, "0000" indicates that information is not compressed, and "0001" indicates that information is compressed in a zip-format.

Information indicating a type of LLS signaling information is set as the type information (Fragment Type). For example, "000000" can be set for SCD as channel selection information, "000001" can be set for EAD (Emergency Alerting Description) as emergency alert information, "000010" can be set for RRD (Region Rating Description) as rating information, and "000011" can be set for DCD (Default Component Description) for performing minimum service selection. Moreover, for example, "000001" may be set as time information (e.g., NTP).

An extension parameter is set as the extension type information for each type. For example, time difference information (Offset) or summertime information related to the time information can be set as the extension type information.

(Time Information)

Figure 17:
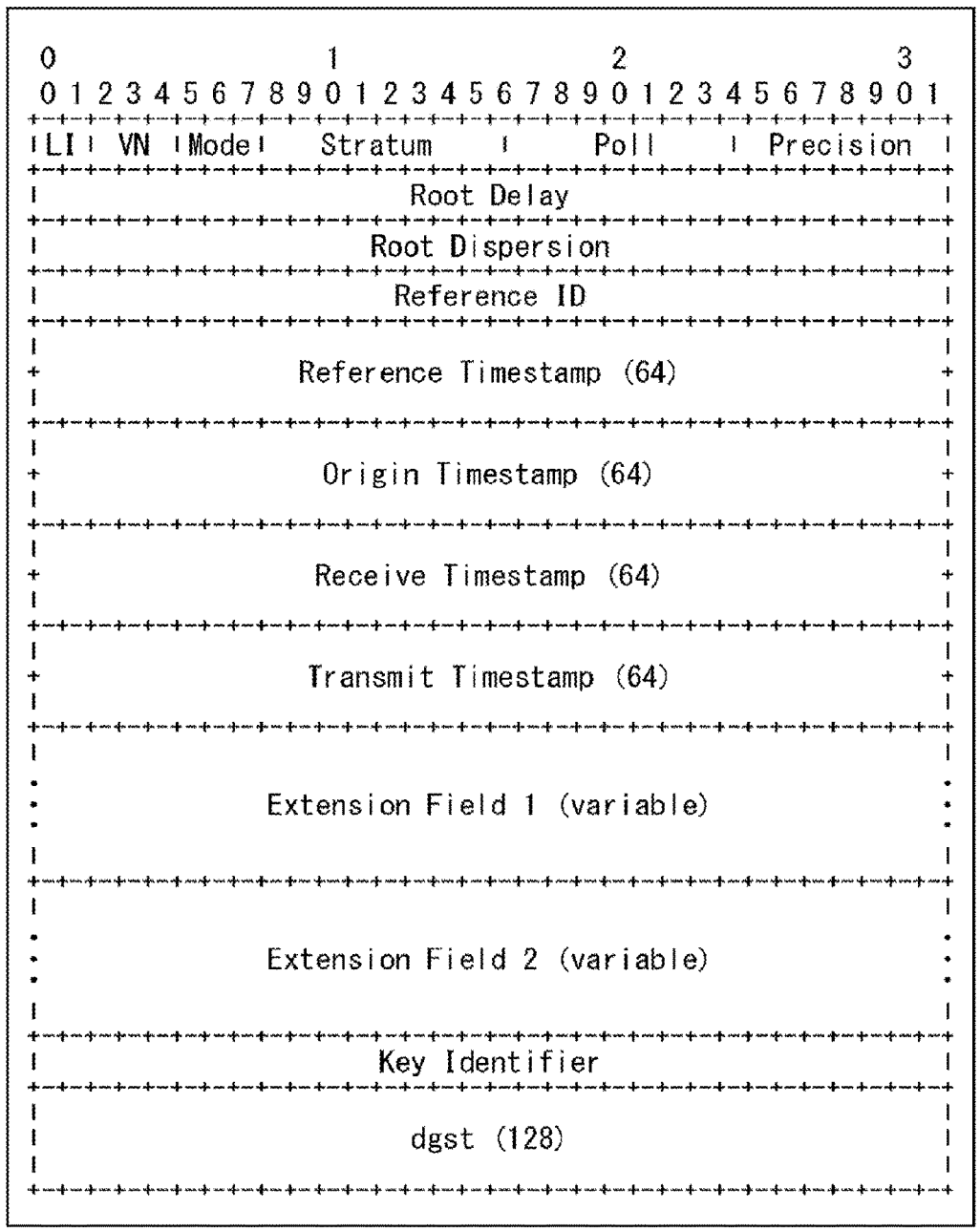
FIG. 17 A diagram showing a configuration example of NTP used as the time information.

FIG. 17 is a diagram showing a configuration example of NTP used as the time information.

2-bit L1 is an abbreviation of Leap Indicator and indicates insertion or deletion of a leap second with respect to the last one minute of the current month. 3-bit VN is an abbreviation of Version Number and indicates an NTP version. 3-bit Mode indicates an NTP operation mode.

8-bit Stratum indicates a stratum and is encoded in accordance with the stratum. 8-bit Poll indicates a maximum interval (by seconds) of consecutive NTP messages as a polling interval. 8-bit Precision indicates system clock precision (by seconds).

Root Delay indicates, as a root delay, a delay of reciprocation until a reference time in an NTP short format. Root Dispersion indicates a dispersion of a total delay until the reference time in the NTP short format. Reference ID indicates an identifier representing the reference time. In the broadcasting system, "0000" indicating NULL is stored.

Reference Timestamp indicates, as a reference timestamp, a time at which a system time has been corrected last in an NTP long format. Origin Timestamp indicates, as a start timestamp, a client time at which a client has transmitted a request to a server in the NTP long format. In the broadcasting system, "0" is stored.

Receive Timestamp indicates, as a reception timestamp, a time of the server at which the request has been received from the client in the NTP long format. In the broadcasting system, "0" is stored. Transmit Timestamp indicates, as a transmission timestamp, a time of the server at which a response is transmitted to the client in the NTP long format. It should be noted that Extension Field 1 and Extension Field 2 are each an extension field.

NTP is configured as described above. It should be noted that time information other than NTP may be used as the time information.

It should be noted that the descriptions above have been given on the case of arranging the channel selection information and time information at a head of the data portion (right after preamble) of the physical layer frame and transmitting them by the L2 signaling transmission system, the L2 extension header transmission system, or the L1 extension header transmission system. In short, the channel selection information and time information only need to be arranged at the head of the data portion (right after preamble) of the physical layer frame, and it is also possible to arrange the channel selection information and time information at the head of the data portion of the physical layer frame by systems other than the 3 transmission systems described above.

Further, although the descriptions above have been given on the case where both the channel selection information and the time information are arranged at the head of the data portion of the physical layer frame, at least one of the channel selection information and the time information only needs to be arranged. Furthermore, although the channel selection information is arranged subsequent to the time information at the head of the data portion of the physical layer frame in FIG. 7 described above, the order is arbitrary, and the time information may be arranged subsequent to the channel selection information. Moreover, although the descriptions above have been given on the channel selection information and time information as specific information arranged at the head of the data portion of the physical layer frame, other specific information with which some kind of an effect can be obtained when arranged at the head of the data portion of the physical layer frame may be arranged.

4. Configurations of Apparatuses

Next, specific configurations of the transmission apparatus 10 and the reception apparatus 20 configuring the transmission system shown in FIG. 1 will be described.

(Configuration of Transmission Apparatus)

Figure 18:
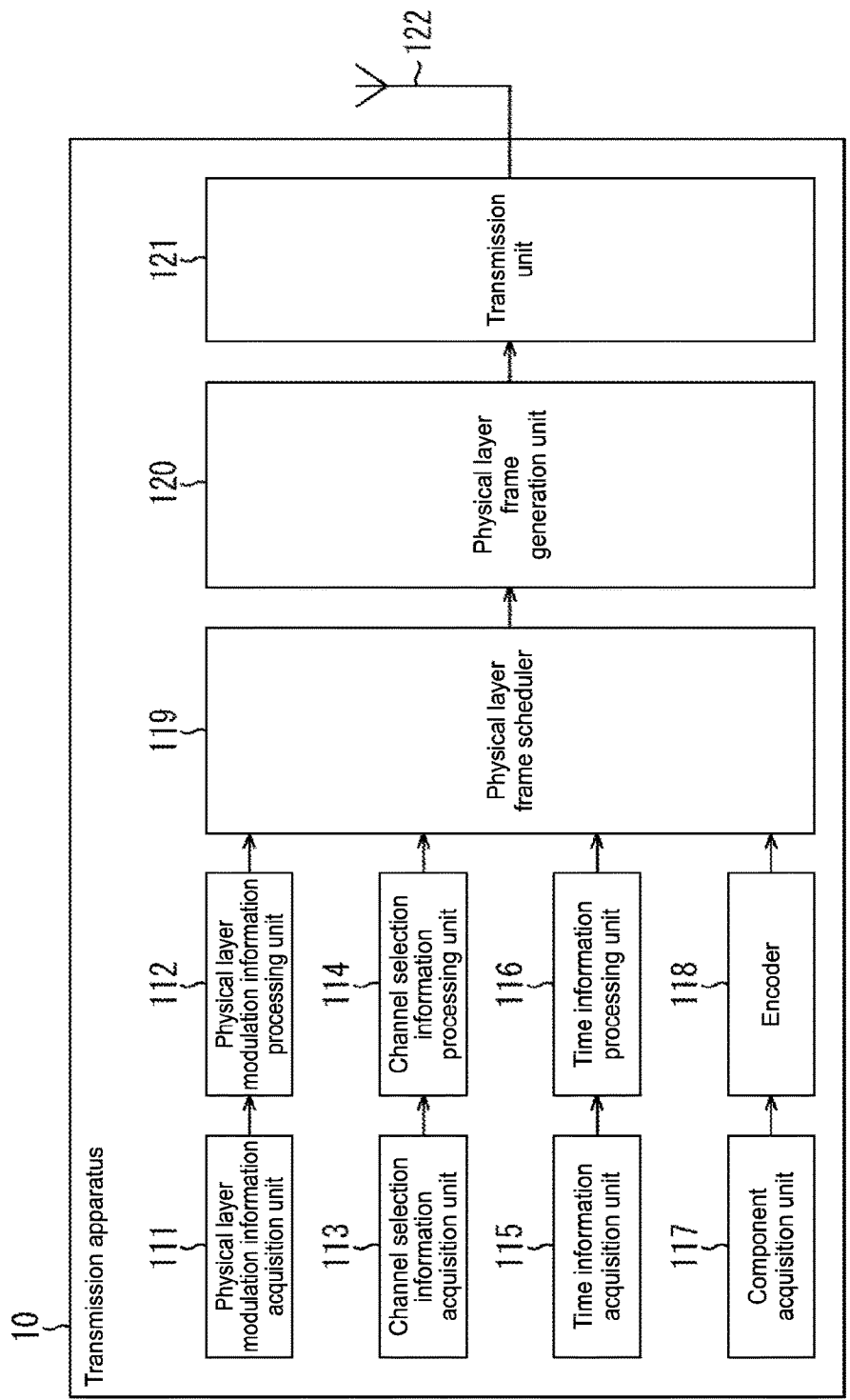
FIG. 18 A diagram showing a configuration example of a transmission apparatus.

FIG. 18 is a diagram showing a configuration example of the transmission apparatus 10 shown in FIG. 1.

In FIG. 18, the transmission apparatus 10 is configured by a physical layer modulation information acquisition unit 111, a physical layer modulation information processing unit 112, a channel selection information acquisition unit 113, a channel selection information processing unit 114, a time information acquisition unit 115, a time information processing unit 116, a component acquisition unit 117, the encoder 118, the physical layer frame scheduler 119, a physical layer frame generation unit 120, and a transmission unit 121.

The physical layer modulation information acquisition unit 111 acquires (generates) physical layer modulation information and supplies it to the physical layer modulation information processing unit 112. The physical layer modulation information processing unit 112 processes the physical layer modulation information supplied from the physical layer modulation information acquisition unit 111 and supplies it to the physical layer frame scheduler 119. It should be noted that L1 signaling information conforming to the ATSC 3.0 standard, for example, is used as the physical layer modulation information.

The channel selection information acquisition unit 113 acquires (generates) channel selection information and supplies it to the channel selection information processing unit 114. The channel selection information processing unit 114 processes the channel selection information supplied from the channel selection information acquisition unit 113 and supplies it to the physical layer frame scheduler 119. It should be noted that SCD as LLS signaling information, for example, is used as the channel selection information.

The time information acquisition unit 115 acquires (generates) time information and supplies it to the time information processing unit 116. The time information processing unit 116 processes the time information supplied from the time information acquisition unit 115 and supplies it to the physical layer frame scheduler 119. It should be noted that NTP, for example, is used as the time information.

The component acquisition unit 117 acquires video and audio data as components configuring a service (e.g., television program) and supplies the data to the encoder 118. The encoder 118 encodes the video and audio data supplied from the component acquisition unit 117 in accordance with a predetermined encoding method and supplies the data to the physical layer frame scheduler 119 as a component stream.

It should be noted that as the component, for example, a relevant content is acquired from a storage of already-recorded contents in accordance with a broadcasting time slot, or a live content is acquired from a studio or location.

The physical layer modulation information from the physical layer modulation information processing unit 112, the channel selection information from the channel selection information processing unit 114, the time information from the time information processing unit 116, and the component stream from the encoder 118 are supplied to the physical layer frame generation unit 120 via the physical layer frame scheduler 119. The physical layer frame generation unit 120 generates a physical layer frame conforming to the ATSC 3.0 standard on the basis of the physical layer modulation information, the channel selection information, the time information, and the component stream and supplies it to the transmission unit 121.

It should be noted that in generating a physical layer frame, the physical layer frame generation unit 120 generates the physical layer frame such that the channel selection information and the time information are arranged at a head of a data portion (right after preamble) of the physical layer frame under management of the physical layer frame scheduler 119. It should be noted that the physical layer modulation information is arranged in a preamble of the physical layer frame.

Specifically, in a case where the L2 signaling transmission system is adopted, the physical layer frame scheduler 119 controls the physical layer frame generation unit 120 to arrange L2 signaling information including the channel selection information and the time information in a payload of a first Generic packet of a first BB frame in the physical layer frame. As a result, the channel selection information and the time information are arranged at the head of the data portion (right after preamble) of the physical layer frame.

Further, in a case where the L2 extension header transmission system is adopted, the physical layer frame scheduler 119 controls the physical layer frame generation unit 120 to arrange L2 signaling information including the channel selection information and the time information in an extension header (L2 extension header) of the first Generic packet of the first BB frame in the physical layer frame. As a result, the channel selection information and the time information are arranged at the head of the data portion (right after preamble) of the physical layer frame.

Furthermore, in a case where the L1 extension header transmission system is adopted, the physical layer frame scheduler 119 controls the physical layer frame generation unit 120 to arrange L1 signaling information including the channel selection information and the time information in an extension header (L1 extension header) of the first BB frame of the physical layer frame. As a result, the channel selection information and the time information are arranged at the head of the data portion (right after preamble) of the physical layer frame.

The transmission unit 121 carries out, on the physical layer frame from the physical layer frame generation unit 120, processing of digital modulation such as OFDM (Orthogonal Frequency Division Multiplexing), upconversion to an RF (Radio Frequency) band (frequency channel allocated to broadcast station), power amplification, and the like and supplies it as digital broadcast signals via an antenna 122.

It should be noted that in the transmission apparatus 10 shown in FIG. 18, not all the functional blocks need to be physically arranged within a single apparatus, and at least a part of the functional blocks may be configured as an apparatus physically independent from other functional blocks.

(Configuration of Reception Apparatus)

Figure 19:
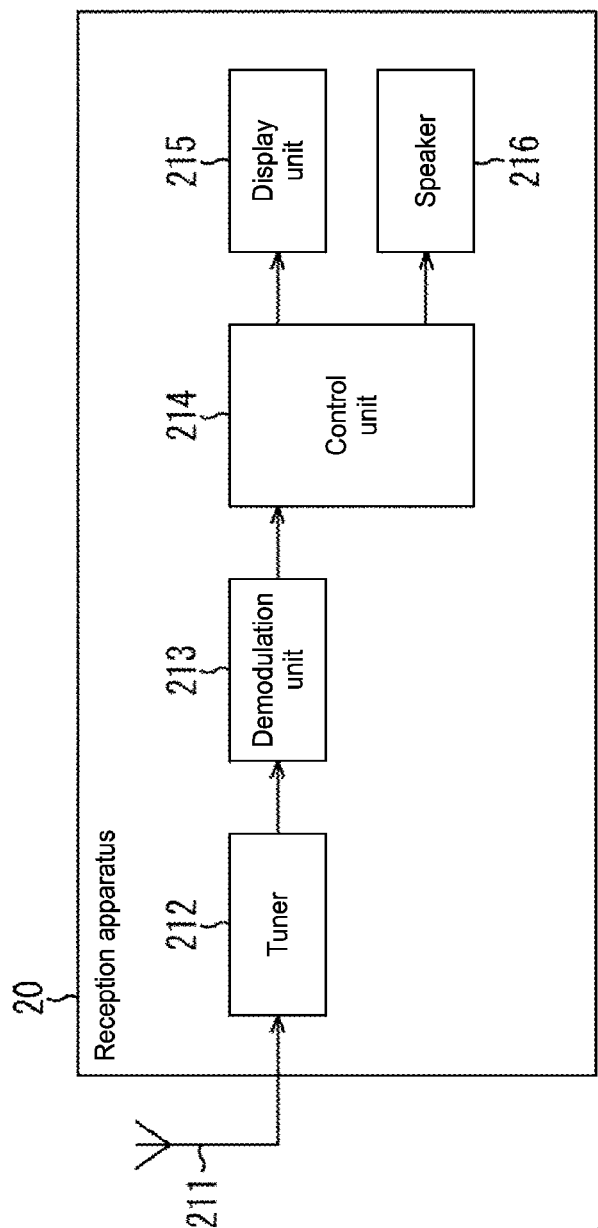
FIG. 19 A diagram showing a configuration example of a reception apparatus.

FIG. 19 is a diagram showing a configuration example of the reception apparatus 20.

In FIG. 19, the reception apparatus 20 is configured by a tuner 212, a demodulation unit 213, a control unit 214, a display unit 215, and a speaker 216.

The tuner 212 performs syntonization of components of a predetermined frequency channel from digital broadcast signals received via an antenna 211. The demodulation unit 213 carries out demodulation processing on the digital broadcast signals syntonized by the tuner 212. This demodulation processing involves, for example, demodulation processing on a physical layer frame that is received as digital broadcast signals and conforms to the ATSC 3.0 standard using physical layer modulation information and the like.

The control unit 214 carries out processing on the signals supplied from the demodulation unit 213. For example, the control unit 214 carries out decoding processing on a component stream obtained from the signals from the demodulation unit 213 in accordance with a predetermined decoding method and causes, on the basis of the resultant video and audio data, the display unit 215 to display a video of a service (television program) and the speaker 216 to output audio. It should be noted that the control unit 214 is configured as a system-on-chip (SoC: System On Chip), for example.

Here, in carrying out the demodulation processing, the demodulation unit 213 acquires channel selection information and time information arranged at a head of a data portion (right after preamble) of the physical layer frame and processes them.

Specifically, in a case where the L2 signaling transmission system is adopted, the demodulation unit 213 acquires channel selection information and time information included in L2 signaling information arranged in a payload of a first Generic packet of a first BB frame in the physical layer frame, to acquire the channel selection information and the time information from the head of the data portion (right after preamble) of the physical layer frame.

Further, in a case where the L2 extension header transmission system is adopted, the demodulation unit 213 acquires channel selection information and time information included in L2 signaling information arranged in an extension header (L2 extension header) of the first Generic packet of the first BB frame in the physical layer frame, to acquire the channel selection information and the time information from the head of the data portion (right after preamble) of the physical layer frame.

Furthermore, in a case where the L1 extension header transmission system is adopted, the demodulation unit 213 acquires channel selection information and time information included in L1 signaling information arranged in an extension header (L1 extension header) of the first BB frame of the physical layer frame, to acquire the channel selection information and the time information from the head of the data portion (right after preamble) of the physical layer frame.

In this way, since the reception apparatus 20 (demodulation unit 213) readily acquires, after acquiring the preamble of the physical layer frame, the channel selection information from the head of the data portion (right after preamble) transmitted subsequent to the preamble, the channel selection processing can be carried out in high speed. Moreover, since the reception apparatus 20 (demodulation unit 213) acquires, after acquiring the preamble of the physical layer frame transmitted in a certain cycle, the time information mapped at the head of the data portion (right after preamble) transmitted subsequent to the preamble, highly-accurate time information can be used to positively synchronize videos and audio, for example.

Further, since the reception apparatus 20 (demodulation unit 213) is capable of acquiring the channel selection information and time information by a normal operation of sequentially acquiring data from a head of a data portion after acquiring a preamble of a physical layer frame, a circuit for acquiring channel selection information and time information arranged at a head of a data portion, or the like does not need to be newly added.

It should be noted that although the display unit 215 and the speaker 216 are incorporated in the reception apparatus 20 shown in FIG. 19, the display unit 215 and the speaker 216 may be provided externally.

5. Flows of Processing Executed by Respective Apparatuses

Figure 20:
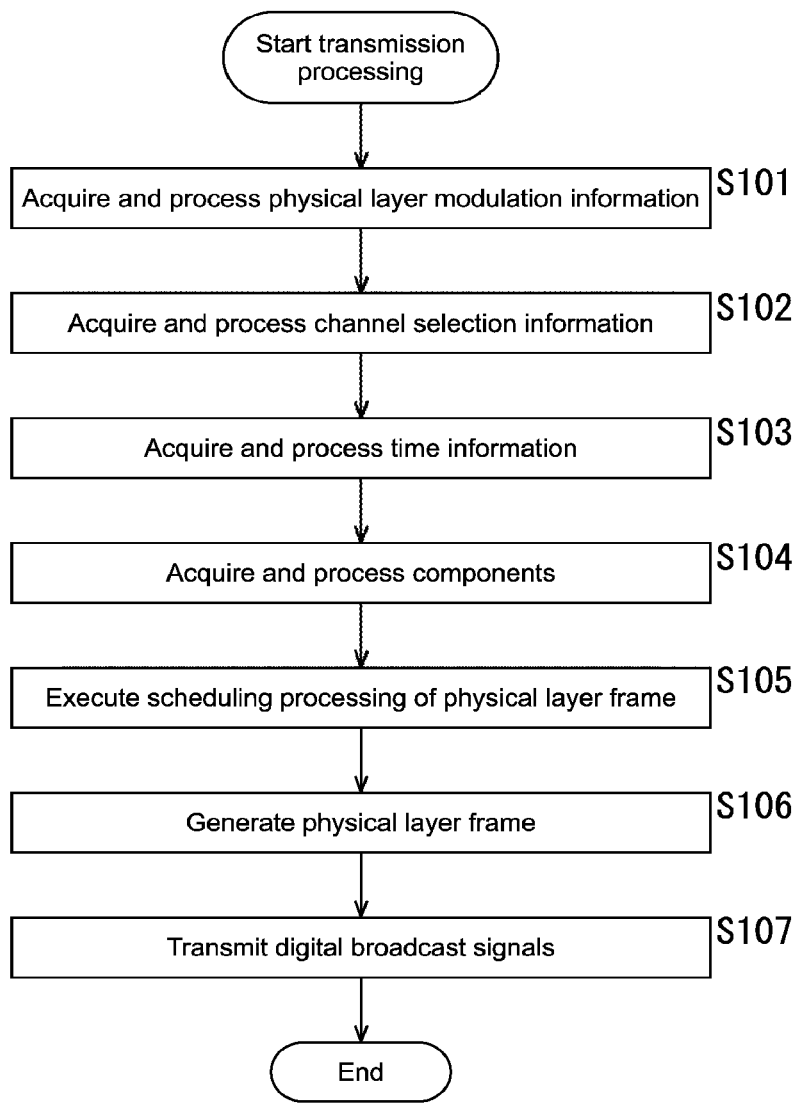
FIG. 20 A flowchart for explaining transmission processing.
Figure 21:
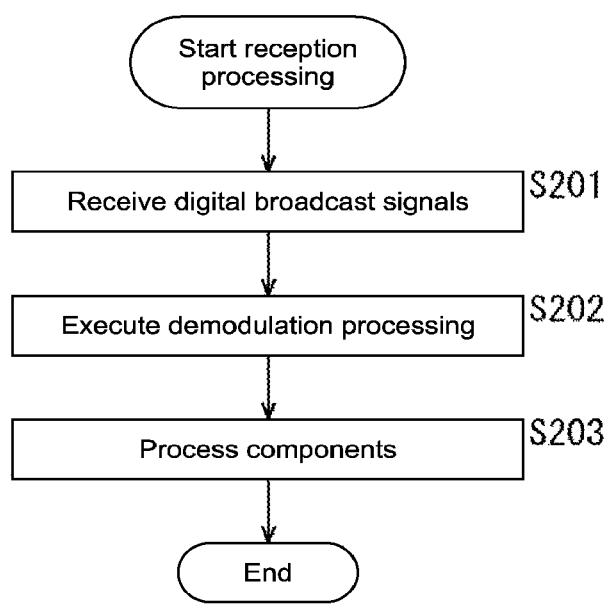
FIG. 21 A flowchart for explaining reception processing.

Next, with reference to the flowcharts of FIGS. 20 and 21, flows of processing executed by the respective apparatuses configuring the transmission system 1 shown in FIG. 1 will be described.

(Transmission Processing)

First, with reference to the flowchart of FIG. 20, transmission processing executed by the transmission apparatus 10 shown in FIG. 1 will be described.

In Step S101, the physical layer modulation information acquisition unit 111 acquires (generates) physical layer modulation information and supplies it to the physical layer modulation information processing unit 112. Also in Step S101, the physical layer modulation information processing unit 112 processes the physical layer modulation information supplied from the physical layer modulation information acquisition unit 111 and supplies it to the physical layer frame scheduler 119.

In Step S102, the channel selection information acquisition unit 113 acquires (generates) channel selection information and supplies it to the channel selection information processing unit 114. Also in Step S102, the channel selection information processing unit 114 processes the channel selection information supplied from the channel selection information acquisition unit 113 and supplies it to the physical layer frame scheduler 119.

In Step S103, the time information acquisition unit 115 acquires (generates) time information and supplies it to the time information processing unit 116. Also in Step S103, the time information processing unit 116 processes the time information supplied from the time information acquisition unit 115 and supplies it to the physical layer frame scheduler 119.

In Step S104, the component acquisition unit 117 acquires video and audio data as components configuring a service (e.g., television program) and supplies the data to the encoder 118. Also in Step S104, the encoder 118 encodes the video and audio data supplied from the component acquisition unit 117 in accordance with a predetermined encoding method and supplies the data to the physical layer frame scheduler 119.

In Step S105, the physical layer frame scheduler 119 controls the physical layer frame generation unit 120 to carry out scheduling processing of a physical layer frame. In Step S106, the physical layer frame generation unit 120 generates a physical layer frame such that channel selection information and time information are arranged at a head of a data portion (right after preamble) of the physical layer frame under control of the physical layer frame scheduler 119 and supplies the physical layer frame to the transmission unit 121.

Specifically, in a case where the L2 signaling transmission system is adopted, the physical layer frame scheduler 119 controls the physical layer frame generation unit 120 to arrange L2 signaling information including the channel selection information and the time information in a payload of a first Generic packet of a first BB frame in the physical layer frame, so that the channel selection information and the time information are arranged at a head of a data portion (right after preamble) of the physical layer frame.

Further, in a case where the L2 extension header transmission system is adopted, the physical layer frame scheduler 119 controls the physical layer frame generation unit 120 to arrange L2 signaling information including the channel selection information and the time information in an extension header (L2 extension header) of the first Generic packet of the first BB frame in the physical layer frame, so that the channel selection information and the time information are arranged at a head of a data portion (right after preamble) of the physical layer frame.

Furthermore, in a case where the L1 extension header transmission system is adopted, the physical layer frame scheduler 119 controls the physical layer frame generation unit 120 to arrange L1 signaling information including the channel selection information and the time information in an extension header (L1 extension header) of the first BB frame of the physical layer frame, so that the channel selection information and the time information are arranged at a head of a data portion (right after preamble) of the physical layer frame.

In Step S107, the transmission unit carries out predetermined processing on the physical layer frame from the physical layer frame generation unit 120 and transmits it as digital broadcast signals via the antenna 122. Upon ending the processing of Step S107, the transmission processing shown in FIG. 20 is ended.

Heretofore, the transmission processing has been described. In this transmission processing, the physical layer frame is generated such that the channel selection information and time information are arranged at a head of the data portion (right after preamble) of the physical layer frame by any one of the L2 signaling transmission system, the L2 extension header transmission system, and the L1 extension header transmission system and transmitted as digital broadcast signals.

(Reception Processing)

Next, with reference to the flowchart of FIG. 21, reception processing executed by the reception apparatus 20 shown in FIG. 1 will be described.

In Step S201, the tuner 212 performs syntonization of components of a predetermined frequency channel from digital broadcast signals received via the antenna 211. In other words, the reception apparatus 20 has received the digital broadcast signals from the transmission apparatus 10.

In Step S202, the demodulation unit 213 carries out demodulation processing on the digital broadcast signals syntonized by the tuner 212. This demodulation processing involves, for example, demodulation processing on a physical layer frame that is received as digital broadcast signals and conforms to the ATSC 3.0 standard using physical layer modulation information and the like. Further, in carrying out the demodulation processing, the demodulation unit 213 acquires channel selection information and time information arranged at the head of the data portion (right after preamble) of the physical layer frame and processes them.

Specifically, in a case where the L2 signaling transmission system is adopted, the demodulation unit 213 acquires channel selection information and time information included in L2 signaling information arranged in a payload of a first Generic packet of a first BB frame in the physical layer frame, to acquire the channel selection information and the time information from the head of the data portion (right after preamble) of the physical layer frame.

Further, in a case where the L2 extension header transmission system is adopted, the demodulation unit 213 acquires channel selection information and time information included in L2 signaling information arranged in an extension header (L2 extension header) of the first Generic packet of the first BB frame in the physical layer frame, to acquire the channel selection information and the time information from the head of the data portion (right after preamble) of the physical layer frame.

Furthermore, in a case where the L1 extension header transmission system is adopted, the demodulation unit 213 acquires channel selection information and time information included in L1 signaling information arranged in an extension header (L1 extension header) of the first BB frame of the physical layer frame, to acquire the channel selection information and the time information from the head of the data portion (right after preamble) of the physical layer frame.

In Step S203, the control unit 214 processes the components on the basis of the result of the demodulation processing of Step S202 and causes, on the basis of the resultant video and audio data, the display unit 215 to display a video of a service (television program) and the speaker 216 to output audio.

At this time, since the reception apparatus 20 (demodulation unit 213) readily acquires, after acquiring the preamble of the physical layer frame, the channel selection information from the head of the data portion (right after preamble) transmitted subsequent to the preamble, the tuner 212 and the like can realize high-speed channel selection processing. Moreover, since the reception apparatus 20 (demodulation unit 213) acquires, after acquiring the preamble of the physical layer frame transmitted in a certain cycle, the time information mapped at the head of the data portion (right after preamble) transmitted subsequent to the preamble, the control unit 214 and the like can positively synchronize videos and audio, for example, using highly-accurate time information. Upon ending the processing of Step S203, the reception processing shown in FIG. 21 is ended.

Heretofore, the reception processing has been described. In this reception processing, since the digital broadcast signals from the transmission apparatus 10 are received and the channel selection information and time information arranged at a head of the data portion (right after preamble) of the physical layer frame by any one of the L2 signaling transmission system, the L2 extension header transmission system, and the L1 extension header transmission system are acquired, high-speed channel selection processing using channel selection information and transmissions of highly-accurate time information can be realized.

6. Configuration of Computer

The series of processing described above can be executed either by hardware or software. In a case where the series of processing is executed by software, a program configuring the software is installed in a computer. FIG. 22 is a diagram showing a hardware configuration example of the computer that executes the series of processing described above by a program.

In a computer 900, a CPU (Central Processing Unit) 901, a ROM (Read Only Memory) 902, and a RAM (Random Access Memory) 903 are connected to one another via a bus 904. Also connected to the bus 904 is an input/output interface 905. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disc, and a semiconductor memory.

In the computer 900 configured as described above, the CPU 901 loads programs stored in the ROM 902 and the recording unit 908 to the RAM 903 via the input/output interface 905 and the bus 904 and executes them, to carry out the series of processing described above.

The programs executed by the computer 900 (CPU 901) can be provided by being recorded onto the removable medium 911 as a package medium, for example. The programs can also be provided via wired or wireless transmission media such as a local area network, the Internet, and digital satellite broadcasting.

In the computer 900, by loading the removable medium 911 in the drive 910, the programs can be installed in the recording unit 908 via the input/output interface 905. The programs can also be received by the communication unit 909 via wired or wireless transmission media to be installed in the recording unit 908. The programs can also be installed in advance in the ROM 902 and the recording unit 908.

Here, the processing carried out by the computer in accordance with the programs in the specification do not necessarily need to be carried out in time series in the order described in the flowcharts. In other words, the processing carried out by the computer in accordance with the programs include processing executed in parallel or individually (e.g., parallel processing or processing that uses object). Moreover, the programs may be processed in a single computer (processor) or may be processed dispersively by a plurality of computers.

It should be noted that the embodiment of the present technology is not limited to the embodiment described above and can be variously modified without departing from the gist of the present technology.

Furthermore, the present technology may also take the following configurations.

(1) A transmission apparatus, including:
  a channel selection information acquisition unit that acquires channel selection information for selecting a service;
  a time information acquisition unit that acquires time information used for synchronizations on a transmission side and a reception side;
  a physical layer frame generation unit that generates, as a physical layer frame constituted of a preamble and a data portion, the physical layer frame in which specific information including at least one of the channel selection information and the time information is arranged at a head of the data portion right after the preamble; and
  a transmission unit that transmits the physical layer frame as digital broadcast signals.
(2) The transmission apparatus according to (1), in which
  the specific information is included in L2 signaling information arranged in a payload of a transmission packet that transmits an IP (Internet Protocol) packet, and
  the transmission packet is transmitted as a first transmission packet of a first BB (Baseband) frame in the physical layer frame.
(3) The transmission apparatus according to (1), in which
  the specific information is included in L2 signaling information arranged in an extension header of a transmission packet that transmits an IP packet, and
  the transmission packet is transmitted as a first transmission packet of a first BB frame in the physical layer frame.
(4) The transmission apparatus according to (1), in which
  the specific information is included in L1 signaling information arranged in an extension header of a BB frame, and
  the BB frame is transmitted as a first BB frame of the physical layer frame.
(5) The transmission apparatus according to any one of (1) to (4), in which
  the channel selection information is LLS (Low Layer Signaling) signaling information, and
  the time information is NTP (Network Time Protocol).
(6) A transmission method for a transmission apparatus, including:
  by the transmission apparatus,
  acquiring channel selection information for selecting a service;
  acquiring time information used for synchronizations on a transmission side and a reception side;
  generating, as a physical layer frame constituted of a preamble and a data portion, the physical layer frame in which specific information including at least one of the channel selection information and the time information is arranged at a head of the data portion right after the preamble; and
  transmitting the physical layer frame as digital broadcast signals.
(7) A reception apparatus, including:
  a reception unit that receives, as a physical layer frame constituted of a preamble and a data portion, digital broadcast signals including the physical layer frame in which specific information including at least one of channel selection information for selecting a service and time information used for synchronizations on a transmission side and a reception side is arranged at a head of the data portion right after the preamble;
  a demodulation unit that demodulates the physical layer frame and acquires the specific information that is arranged at the head of the data portion right after the preamble and includes at least one of the channel selection information and the time information; and
  a processing unit that carries out predetermined processing on the basis of the specific information.
(8) The reception apparatus according to (7), in which
  the specific information is included in L2 signaling information arranged in a payload of a transmission packet that transmits an IP packet, and
  the transmission packet is transmitted as a first transmission packet of a first BB frame in the physical layer frame.
(9) The reception apparatus according to (7), in which
  the specific information is included in L2 signaling information arranged in an extension header of a transmission packet that transmits an IP packet, and
  the transmission packet is transmitted as a first transmission packet of a first BB frame in the physical layer frame.
(10) The reception apparatus according to (7), in which
  the specific information is included in L1 signaling information arranged in an extension header of a BB frame, and
  the BB frame is transmitted as a first BB frame of the physical layer frame.
(11) The reception apparatus according to any one of (7) to (10), in which
  the processing unit selects the service on the basis of the channel selection information.
(12) The reception apparatus according to any one of (7) to (11), in which
  the processing unit synchronizes a video and audio configuring the service on the basis of the time information.
(13) The reception apparatus according to any one of (7) to (12), in which
  the channel selection information is LLS signaling information, and
  the time information is NTP.
(14) A reception method for a reception apparatus, including:
  by the reception apparatus,
  receiving, as a physical layer frame constituted of a preamble and a data portion, digital broadcast signals including the physical layer frame in which specific information including at least one of channel selection information for selecting a service and time information used for synchronizations on a transmission side and a reception side is arranged at a head of the data portion right after the preamble;
  demodulating the physical layer frame and acquiring the specific information that is arranged at the head of the data portion right after the preamble and includes at least one of the channel selection information and the time information; and carrying out predetermined processing on the basis of the specific information.

REFERENCE SIGNS LIST 1 transmission system
10 transmission apparatus
20 reception apparatus
30 transmission channel
113 channel selection information acquisition unit
115 time information acquisition unit
119 physical layer frame scheduler
120 physical layer frame generation unit
121 transmission unit
212 tuner
213 demodulation unit
214 control unit
215 display unit
216 speaker 900 computer
901 CPU

The invention claimed is:
1. A transmission apparatus, comprising:
circuitry configured to
acquire channel selection information for selecting a service;
acquire time information used for synchronizations on a transmission side and a reception side;
generate a physical layer frame, constituted of a preamble and a data portion, in which specific information including at least one of the channel selection information and the time information is arranged at a head part in the data portion right after the preamble, wherein the channel selection information is LLS (Low Layer Signaling) signaling information and the time information is NTP (Network Time Protocol); and
transmit the physical layer frame as digital broadcast signals.

2. The transmission apparatus according to claim 1, wherein
the specific information is included in L2 signaling information arranged in a payload of a transmission packet that transmits an IP (Internet Protocol) packet, and
the transmission packet is transmitted as a first transmission packet of a first BB (Baseband) frame in the physical layer frame, wherein
the transmission packet and the first BB frame become a part of the data portion in the physical layer frame.

3. The transmission apparatus according to claim 1, wherein
the specific information is included in L2 signaling information arranged in an extension header of a transmission packet that transmits an IP packet, and
the transmission packet is transmitted as a first transmission packet of a first BB frame in the physical layer frame, wherein
the transmission packet and the first BB frame become a part of the data portion in the physical layer frame.

4. The transmission apparatus according to claim 1, wherein
the specific information is included in L1 signaling information arranged in an extension header of a BB frame, and
the BB frame is transmitted as a first BB frame of the physical layer frame, wherein
the BB frame becomes a part of the data portion in the physical layer frame.

5. A transmission method for a transmission apparatus, comprising:
by the transmission apparatus,
acquiring channel selection information for selecting a service;
acquiring time information used for synchronizations on a transmission side and a reception side;
generating a physical layer frame, constituted of a preamble and a data portion, in which specific information including at least one of the channel selection information and the time information is arranged at a head part in the data portion right after the preamble, wherein the channel selection information is LLS (Low Layer Signaling) signaling information and the time information is NTP (Network Time Protocol); and
transmitting the physical layer frame as digital broadcast signals.

6. A reception apparatus, comprising:
circuitry configured to
receive digital broadcast signals including a physical layer frame, constituted of a preamble and a data portion, in which specific information including at least one of channel selection information for selecting a service and time information used for synchronizations on a transmission side and a reception side is arranged at a head part in the data portion right after the preamble, wherein the channel selection information is LLS (Low Layer Signaling) signaling information and the time information is NTP (Network Time Protocol);
demodulate the physical layer frame;
acquire the specific information that is arranged at the head part in the data portion right after the preamble and includes at least one of the channel selection information and the time information; and
carry out predetermined processing on the basis of the specific information.

7. The reception apparatus according to claim 6, wherein
the specific information is included in L2 signaling information arranged in a payload of a transmission packet that transmits an IP packet, and
the transmission packet is transmitted as a first transmission packet of a first BB frame in the physical layer frame, wherein
the transmission packet and the first BB frame become a part of the data portion in the physical layer frame.

8. The reception apparatus according to claim 6, wherein
the specific information is included in L2 signaling information arranged in an extension header of a transmission packet that transmits an IP packet, and
the transmission packet is transmitted as a first transmission packet of a first BB frame in the physical layer frame, wherein
the transmission packet and the first BB frame become a part of the data portion in the physical layer frame.

9. The reception apparatus according to claim 6, wherein
the specific information is included in L1 signaling information arranged in an extension header of a BB frame, and
the BB frame is transmitted as a first BB frame of the physical layer frame, wherein
the BB frame becomes a part of the data portion in the physical layer frame.

10. The reception apparatus according to claim 6, wherein
the service is selected on the basis of the channel selection information.

11. The reception apparatus according to claim 6, wherein
a video and audio configuring the service are synchronized on the basis of the time information.

12. A reception method for a reception apparatus, comprising:
by the reception apparatus,
receiving digital broadcast signals including a physical layer frame, constituted of a preamble and a data portion, in which specific information including at least one of channel selection information for selecting a service and time information used for synchronizations on a transmission side and a reception side is arranged at a head part in the data portion right after the preamble, wherein the channel selection information is LLS (Low Layer Signaling) signaling information and the time information is NTP (Network Time Protocol);
demodulating the physical layer frame;

acquiring the specific information that is arranged at the head part in the data portion right after the preamble and includes at least one of the channel selection information and the time information; and carrying out predetermined processing on the basis of the specific information.

* * * * *